Oct. 20, 1953    J. H. BENT    2,656,219
METHOD AND MACHINE FOR MANUFACTURING APPLICATORS
Filed Oct. 14, 1948    16 Sheets-Sheet 1

INVENTOR.
John H. Bent,
BY Ira J. Wilson
Atty.

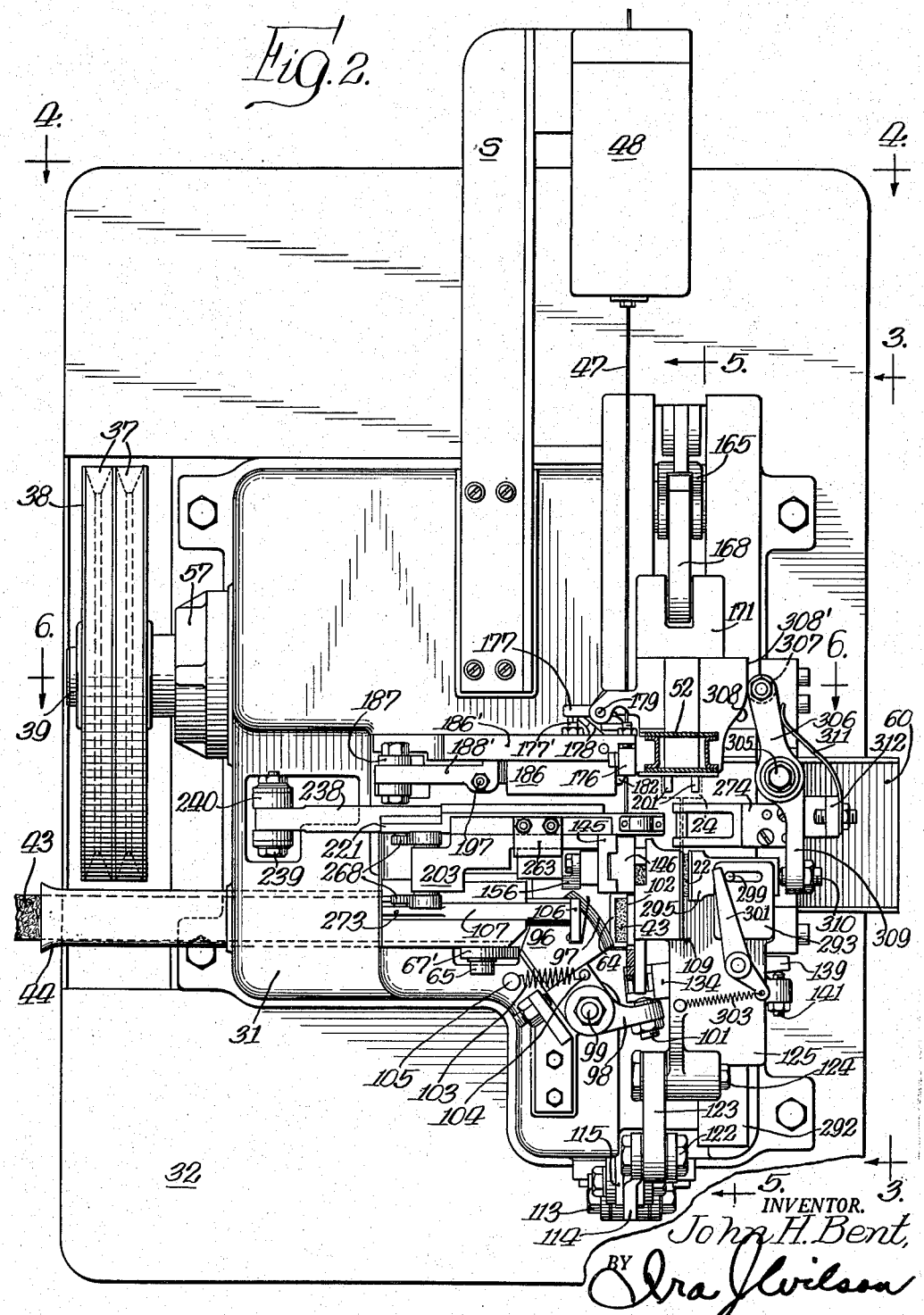

Oct. 20, 1953   J. H. BENT   2,656,219
METHOD AND MACHINE FOR MANUFACTURING APPLICATORS
Filed Oct. 14, 1948   16 Sheets-Sheet 3
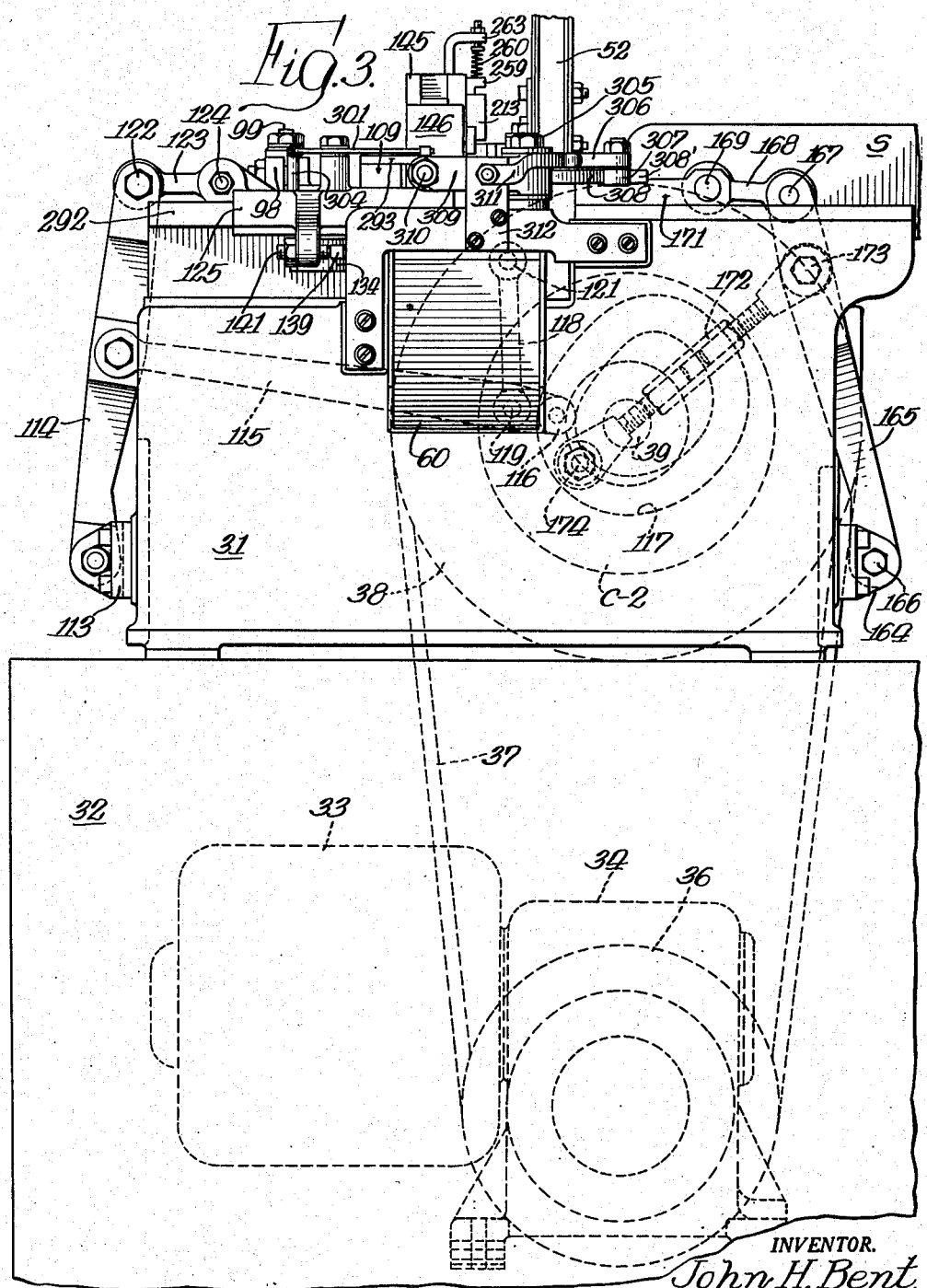
INVENTOR.
John H. Bent,
BY Ira J. Wilson
Atty.

Oct. 20, 1953        J. H. BENT        2,656,219
METHOD AND MACHINE FOR MANUFACTURING APPLICATORS
Filed Oct. 14, 1948        16 Sheets-Sheet 4
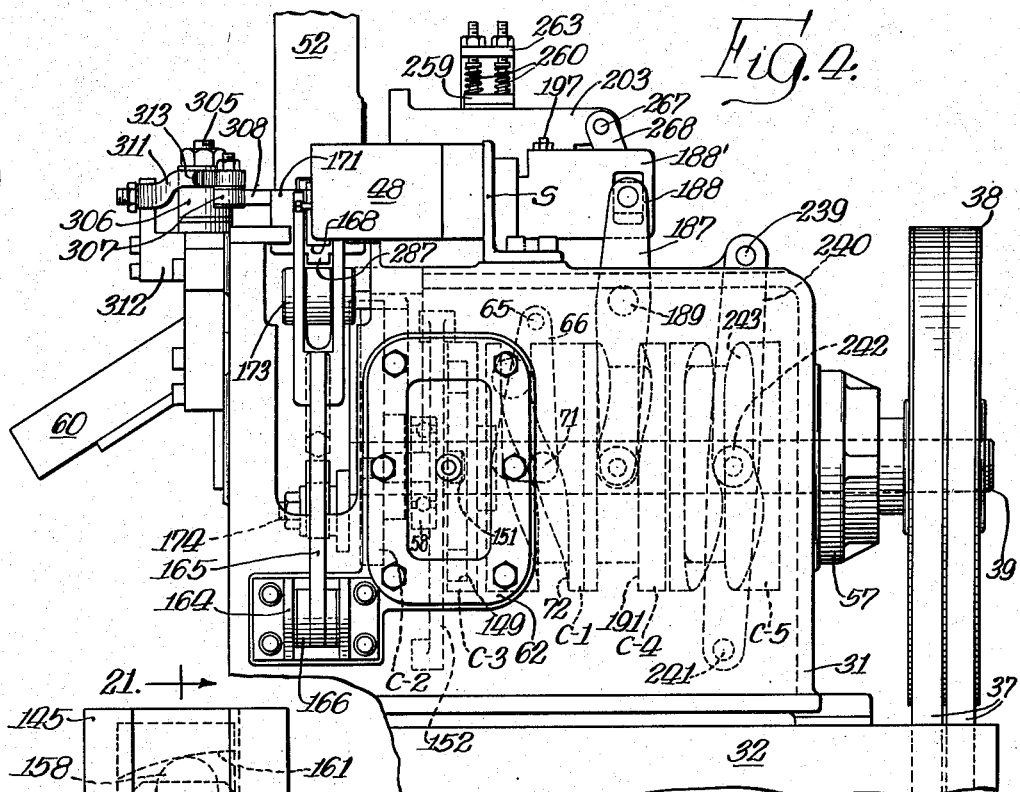
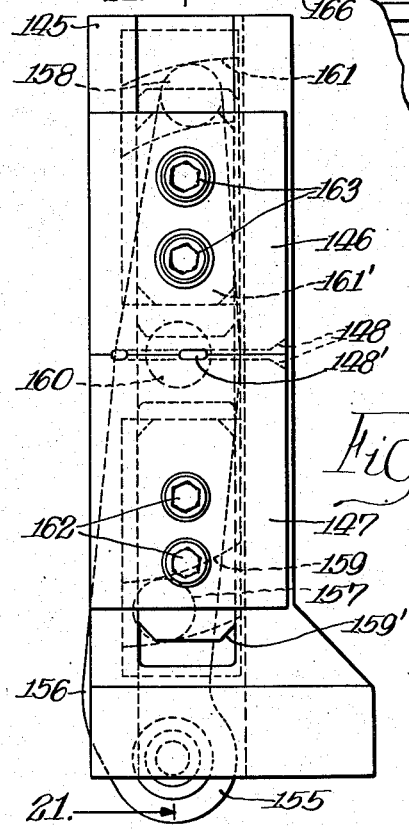
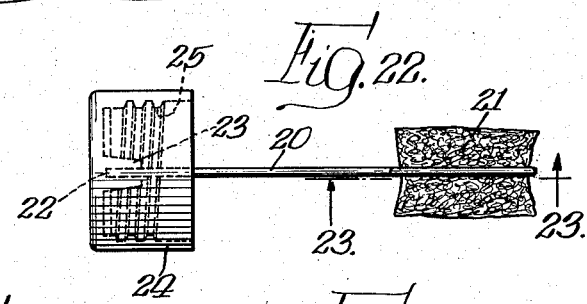
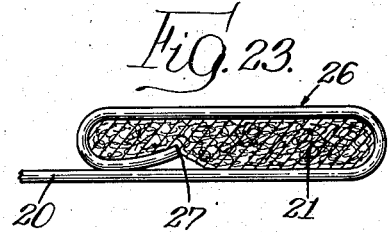
INVENTOR.
John H. Bent,
BY Ira J. Wilson
Atty.

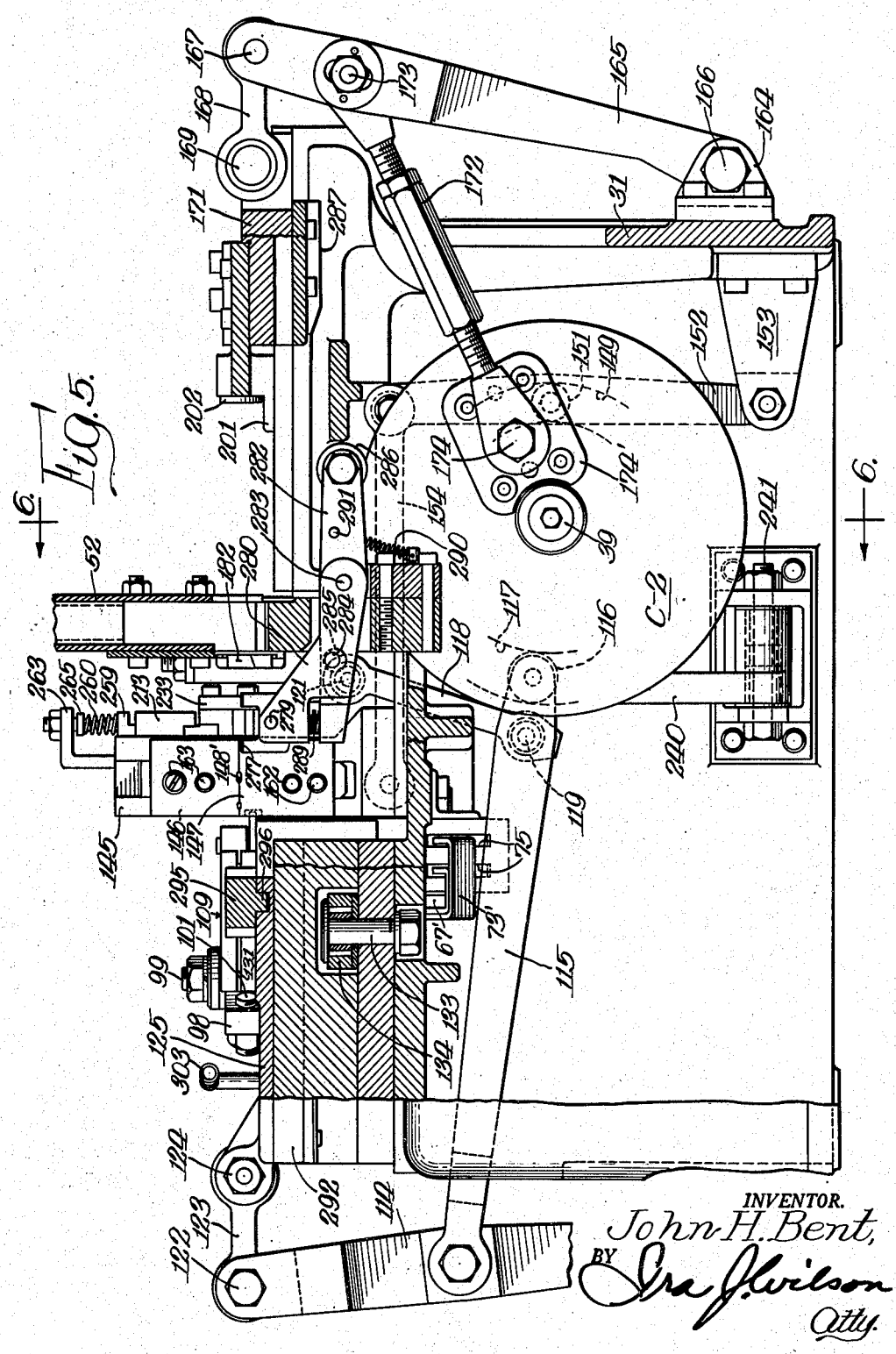

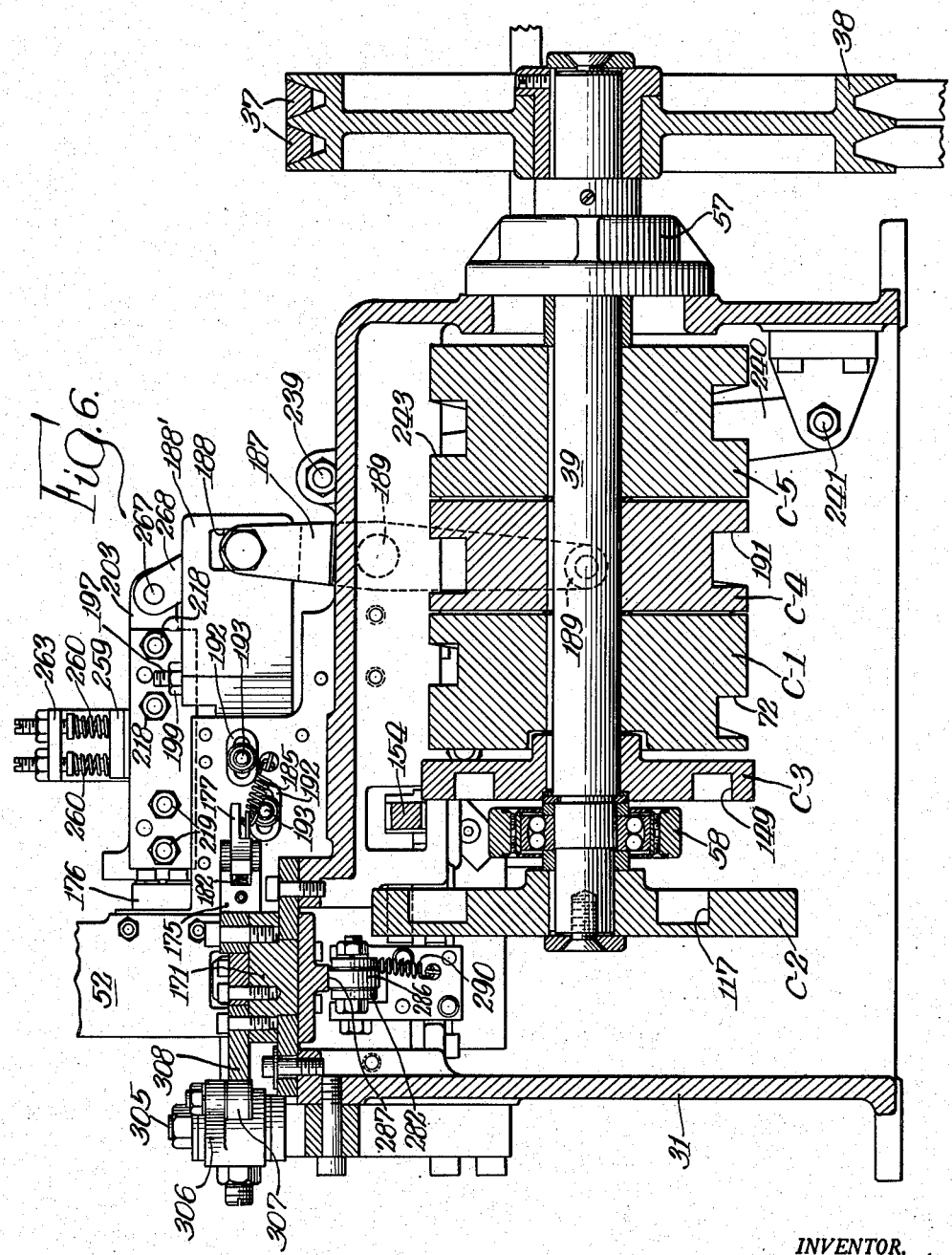

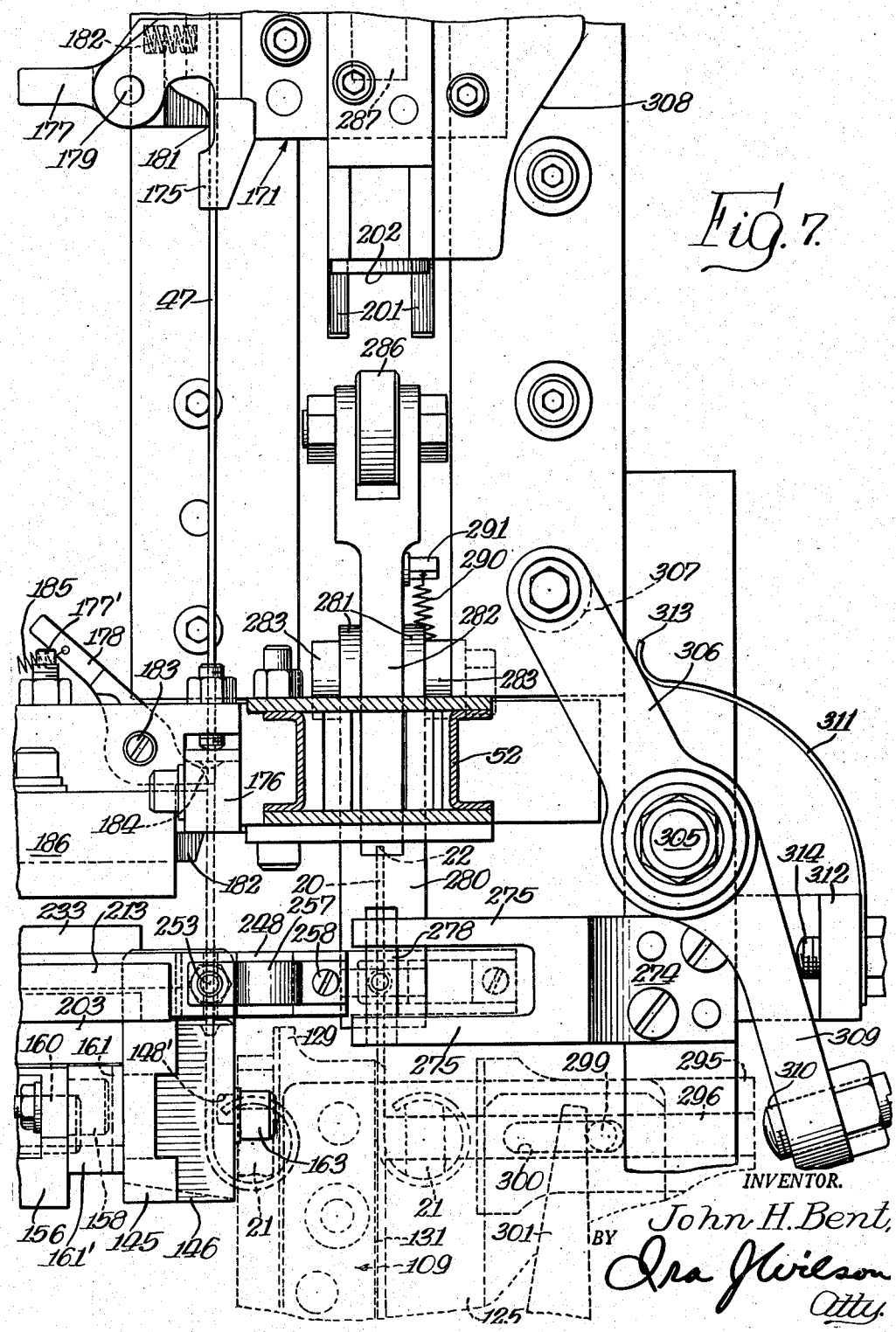

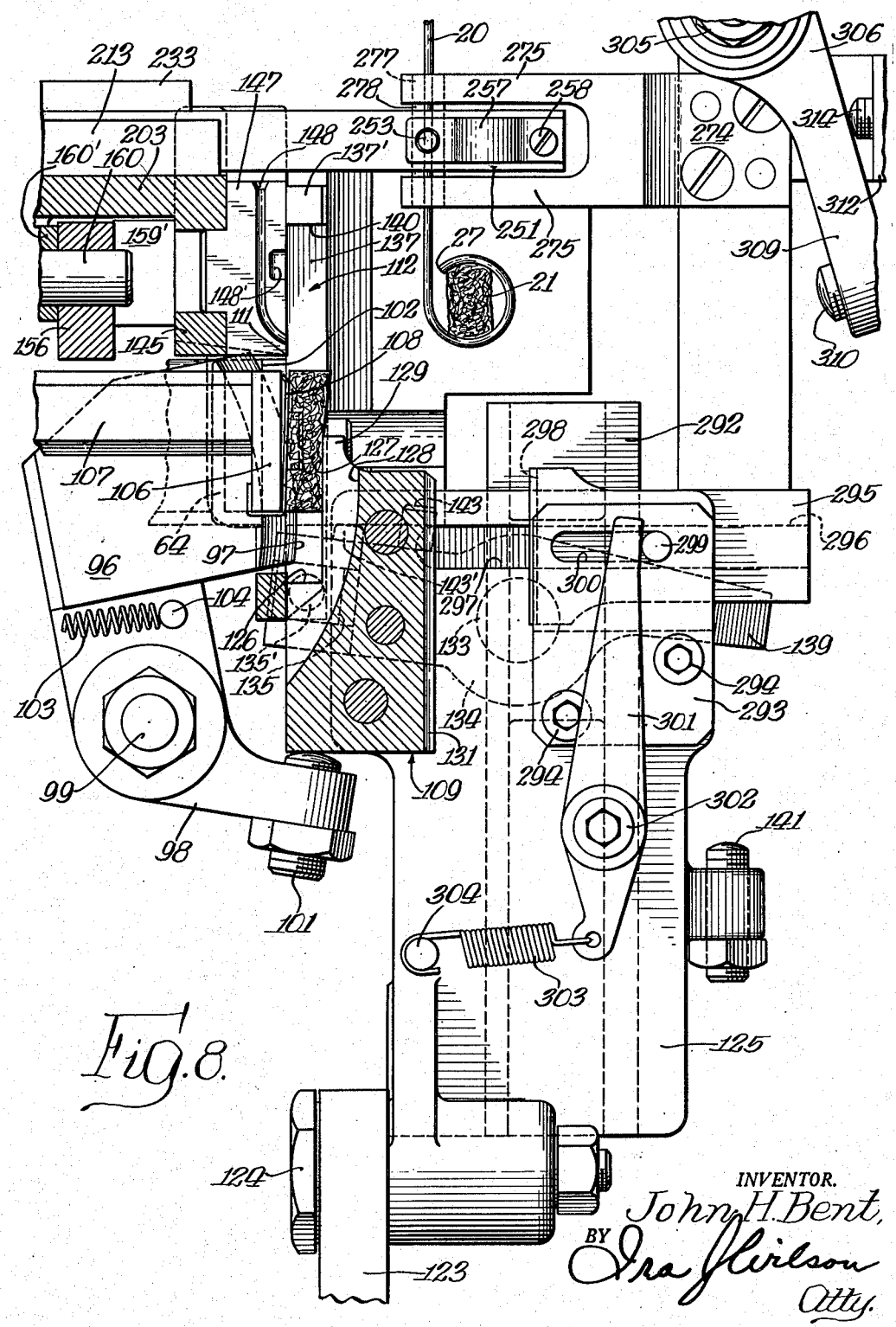

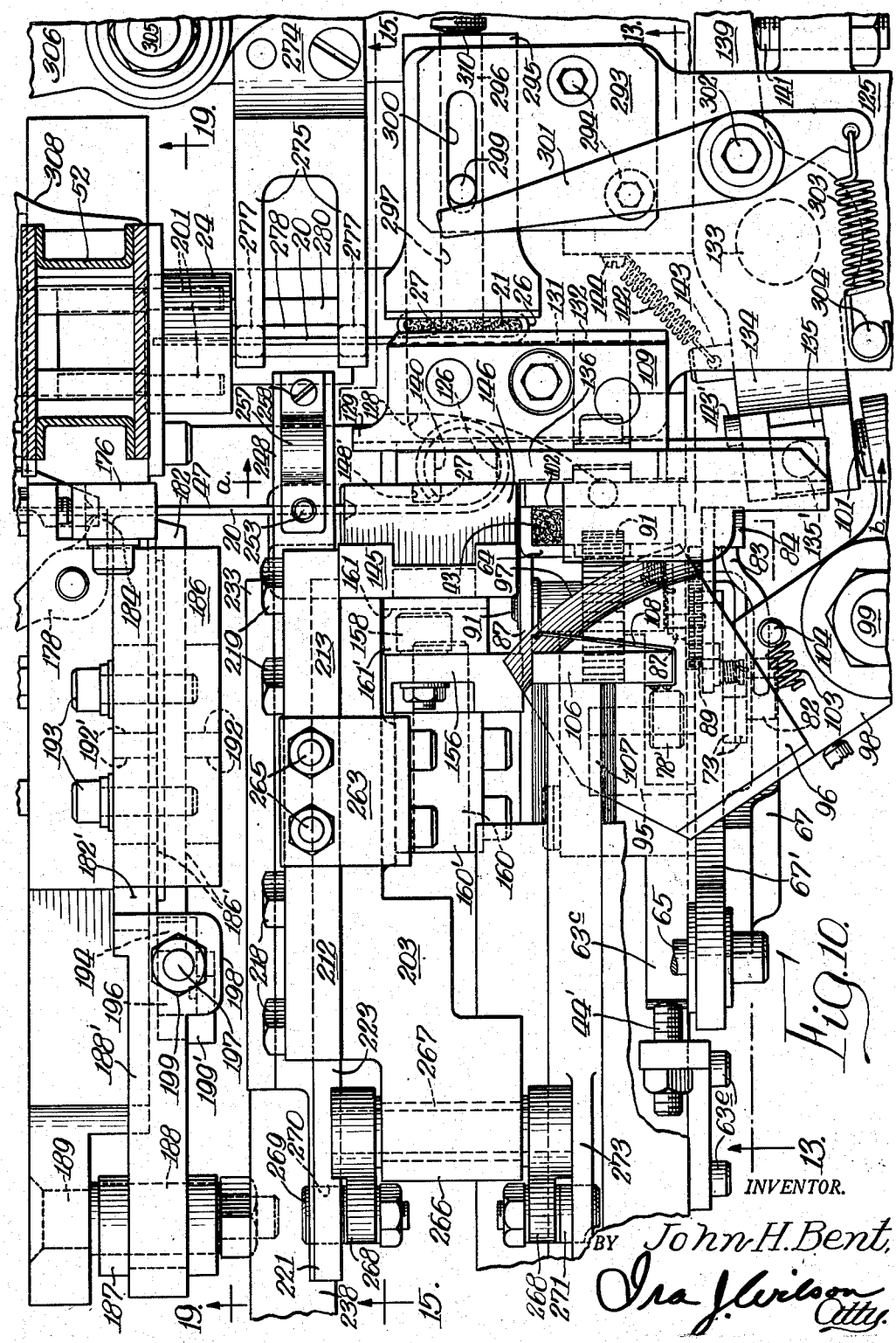

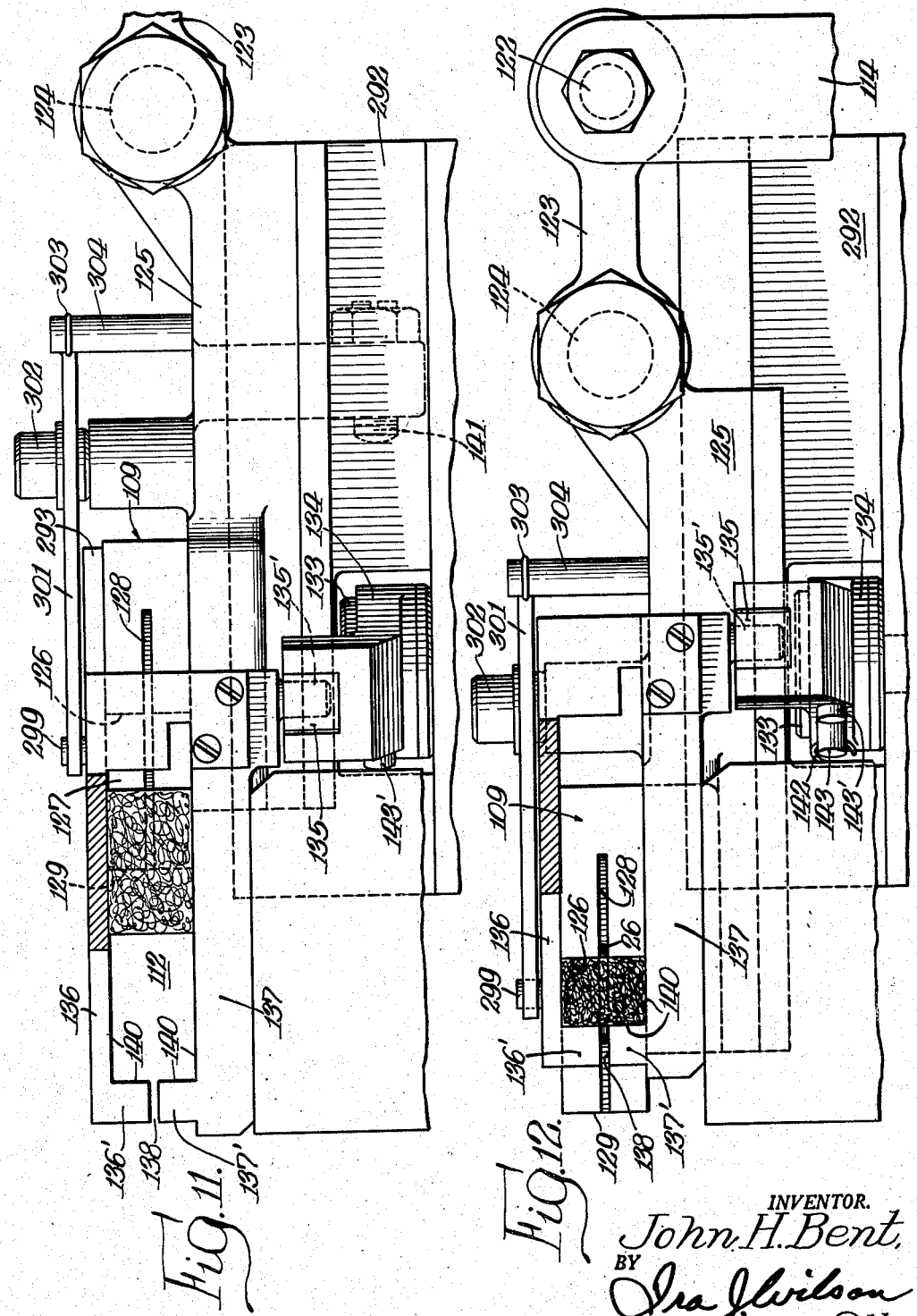

Oct. 20, 1953     J. H. BENT     2,656,219
METHOD AND MACHINE FOR MANUFACTURING APPLICATORS
Filed Oct. 14, 1948     16 Sheets-Sheet 13

INVENTOR.
John H. Bent,
BY Ira J. Wilson
Atty.

Oct. 20, 1953  J. H. BENT  2,656,219
METHOD AND MACHINE FOR MANUFACTURING APPLICATORS
Filed Oct. 14, 1948  16 Sheets-Sheet 15

INVENTOR.
John H. Bent,
BY Ira J. Wilson
Atty.

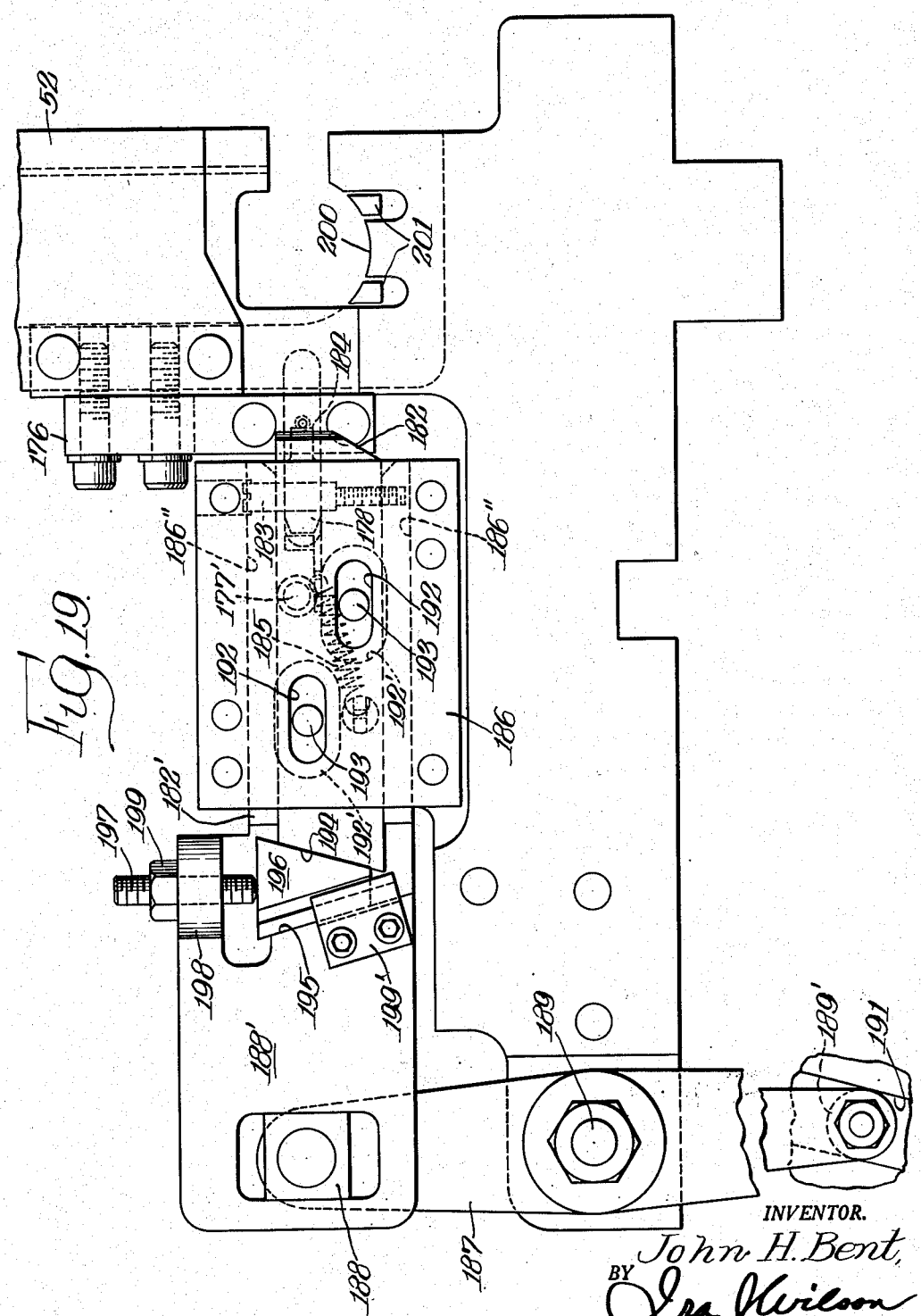

Patented Oct. 20, 1953

2,656,219

UNITED STATES PATENT OFFICE 2,656,219

METHOD AND MACHINE FOR MANUFACTURING APPLICATORS

John H. Bent, Chicago, Ill., assignor to Barton Manufacturing Company, St. Louis, Mo., a corporation of Missouri Application October 14, 1948, Serial No. 54,544

11 Claims. (Cl. 300—21)

This invention relates to machines for manufacturing applicators, daubers and similar devices for household, medical and other purposes, to methods of manufacturing such devices, and to the dauber or applicator produced by such machine or by the employment of such methods of manufacture. Chosen for illustration of the invention herein is a shoe dauber for application of dye or polish to shoes and other leather goods and a machine for the manufacture of that type of applicator.

One of the principal objectives of the invention is the provision of a machine by which wire for a dauber or applicator stem, absorbent material for the body or "swab" of the dauber or applicator, and a finger grip, or a cap or cover for a bottle or other container for the substance to be applied by the applicator or dauber, may be fed, assembled and ejected as an automatic or substantially automatic series of operations. In this connection it is to be noted (as later will become fully apparent) that the machine may be employed to assemble applicator stems and absorbent material bodies without caps or finger grip, or to make stems alone without a swab body or cap, or it may be used solely for the purpose of assembling stems and caps or fingers grips without any dauber or applicator body as such, as where the stem alone is to serve as a dipper or applicator either as a straight or curled or bent rod.

Another of the invention objectives is to provide a machine of the character mentioned so constructed and arranged that with such adjustments or modifications of parts and, perhaps, changes in operation sequences, the machine may be employed to operate upon a wide variety of finger grips or handles, container caps or covers, wire or other material of different gauges and lengths, and "swab" or dauber or applicator body material of many types and kinds including felt, sponge, sponge rubber, cellulose sponge, cotton, cloth and so forth.

As another objective the invention contemplates the provision of special mechanisms and mechanism relationships for the attainment of the foregoing and other objectives and includes particular mechanism for cutting, compressing and otherwise handling the "swab" or body material, for feeding, cutting, curling and securing wire or other material in desired lengths and firmly fastening the swab material thereto, for positively feeding and securing a finger or hand grip including container covers or caps and firmly securing such part to a dauber or applicator stem whether the latter does or does not carry a swab or body, and for ejecting the completed assembly.

Among the more important objectives also, is that of providing novel methods or processes, with attendant advantages as will appear, whereby a dauber or applicator made with a wire or other stiff material embracing and securing a wad or other form of swab or dauber and intended for use, as in application to the human skin or to leather where a wire end might cause abrasion or other injury, will be so formed that the end of the wire or other material of the stem will be embedded in the swab body or otherwise located so that such end is disposed where no ordinary use of the applicator will bring it into injuring contact with the object to which the applicator is applied.

Another objective feature of the invention resides in certain methods or processes whereby the manufacture of devices of the character mentioned is expedited and simplified and the unit costs reduced while the product is enhanced in value through an improved construction, such methods or processes including the feature of positioning a pre-compressed wad or piece of applicator or dauber body material, coiling a wire in a confining loop about such compressed body and flattening the loop against the body, preferably in such manner that the end of the wire loop is disposed in a harmless position, the feature of flattening the wire loop against the dauber or applicator body and holding the latter firmly by the compressing means while the finger grip or container cap or cover is secured to the stem, the feature of driving the finger grip, cap or cover onto the stem end while the stem remains relatively stationary, and the feature of performing operations substantially simultaneously on two product items thereby to minimize manipulation and needless handling.

Still another important object resides in the provision of novel features of construction in the resulting article of manufacture; that is, the applicator or dauber, whereby the body is firmly and securely held on the stem and the end of the wire loop which extends about the body is so disposed with respect to the body that it can cause no injury to person or property when in use, and whereby there is uniformity as between successive products or, in other words, each applicator or dauber is like every other applicator or dauber similarly made.

Many other objects as well as the advantages and uses of the invention and its several phases will become apparent and understood after reading the following description and claims and after viewing the drawings, in which:

Fig. 2 is a plan view omitting the wire and cap supply devices, and the details of a wire straightening device;

Fig. 3 is an elevation looking from the line 3—3 of Fig. 2 at the discharge side of the machine, i. e., the right hand side of Figs. 1 and 2;

Fig. 4 is an elevational view looking from the line 4—4 of Fig. 2, certain parts being broken away;

Fig. 5 is a vertical sectional view on the line 5—5 of Fig. 2;

Fig. 6 is a vertical sectional view on the line 6—6 of each of Figs. 2 and 5;

Fig. 7 is an enlarged plan view of the wire and cap feed mechanisms showing their relationship to certain other mechanisms;

Figs. 8 and 9 are plan views with some parts in section and some omitted, showing successive stages of position of the mechanisms in cutting and transferring the felt, in transferring the felt and stem assembly to a position for assembly of the cap and final compression and securing of the felt, and in performance of certain related operations;

Fig. 10 is a view similar to that of Fig. 7 showing the loop flattening hammer in advanced position and showing the wire cutter and the felt cutter in positions successive to those shown in Fig. 9;

Figs. 11 and 12 are sectional views taken substantially along the section line a—b of Fig. 10, showing certain successive positions of the felt transferring and compressing mechanisms and related parts;

Figure 15:
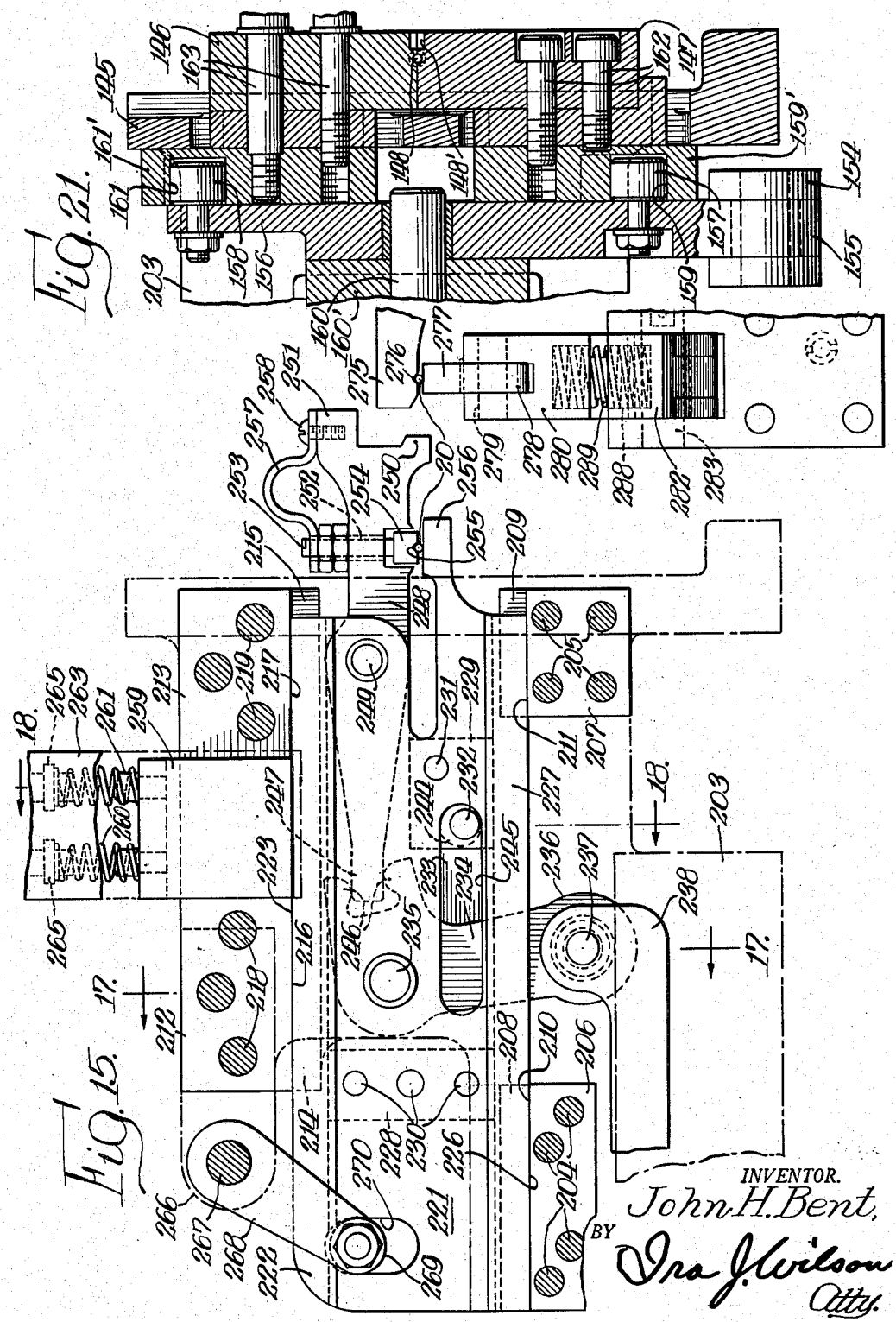
Fig. 15 is a view in elevation showing details of the wire stem holding and transferring mechanism taken on the line 15—15 of Fig. 10.

Figs. 17 and 18 are sectional views taken substantially along the lines 17—17 and 18—18, respectively, of Fig. 15;

Fig. 19 is an elevational view of the wire cutter mechanism taken along the line 19—19 of Fig. 10;

Fig. 20 is a fragmentary view in elevation of the wire curling dies and the mechanism for opening and closing them;

Fig. 21 is a section on section line 21—21 of Fig. 20;

Fig. 22 illustrates a completed dauber; and

Fig. 23 is a sectional view of a portion of the dauber taken on the line 23—23 of Fig. 22.

The machine in general and its functions

The machine illustrated is constructed and arranged to perform its multiple functions automatically in timed sequential relation to one another, in so doing carrying out the preferred process or method of constructing daubers or applicators for shoe polish whereby the desired dauber of improved construction is produced at relatively high speed and low cost. Any suitable source of power such as electric motors may be employed to drive the mechanisms involved.

Each dauber is composed of three elements, a body of felt or similar absorbent material, a wire stem and a finger-piece or combined finger-piece and bottle or container cap, which are fed to the machine from separate sources and combined or assembled by the machine and discharged therefrom as the final dauber product. The felt for the dauber bodies is fed to the machine in the form of a substantially continuous strip from a roll carried by a drum or reel and, in the machine disclosed herein, is cut into dauber bodies of predetermined size. After being cut from the strip each dauber body is transferred to a position where it is compressed about a mid-portion and held in such condition while an end portion of a wire stem is looped or coiled thereabout. The wire for the dauber stems is fed to the machine from a coil carried by a drum or reel and is cut into predetermined stem lengths, one end of a stem length being coiled about a body during the movement of the length as it is fed to the wire cutting position.

As indicated above, the dauber body is placed under compression at a mid-portion and held in compression while the wire stem end is looped thereabout. The wire loop at this stage is substantially circular with an internal diameter substantially equal to or only slightly greater than one dimension of a mid-portion of the felt body as reduced by the compression so that, as the initial compressive force is relieved, the felt body will be retained under compression (although permitted to expand to a degree) as it will be restrained by the wire coil or loop against expansion to its original dimensions. Following the looping of a stem end about a dauber body, the assembled stem and body are transferred as a unit to another position where the loop is crushed or distorted into tight frictional engagement with the body, the distortion or crushing serving to effect an even greater compression of that part of the body material which is within the confines of the loop. At this time, that is, while the assembly of stem and body are held in the last mentioned position, a pre-formed finger grip or combined finger grip and bottle cap is fed from a suitable hopper or other source of supply and impaled on the free end of the stem. Thereafter the completed dauber is discharged from the machine.

The product of the machine illustrated.

The primary present use of the machine disclosed herein, as above indicated, is to manufacture shoe daubers or applicators useful in transferring liquid shoe dye or polish from a container and applying such liquid in limited quantity to shoes or other leather goods. The dauber product is shown in Figs. 22 and 23 and in process of formation in several other views. It will be helpful to an appreciation of the machine and its particular functions and to an appreciation of the processes preferably employed, to obtain a full understanding of the product and its novel features. Accordingly the dauber will be described first.

The dauber stem 20 is made from a wire of the composition of a medium carbon-medium hard steel having a substantial degree of stiffness or rigidity, although it may be composed of other metal or material capable of being worked or formed and functioning in the manner and for the purposes to be described. The stem 20 is straight between one end of the dauber body 21, composed of an absorbent or spongy material such as felt or the like, and its opposite end 22 which is embedded within a central boss 23 integral with a circular cup-shaped cap 24 molded from a suitable plastic and having an internally molded thread 25. The cap, as such, forms no part of the invention and may be replaced by a cork, wood or other material stopper or finger grip of any preferred type.

The felt or other material used for the body of the dauber is held under substantial compression and with a vise-like grip about a mid-portion of the other end of the wire stem which, for such purpose, is looped or coiled in such manner that it makes approximately one and one-seventh (1⅐) turns about the body when in finished condition and positions. It will be observed from Figs. 22 and 23 that the loop or coil 26 lies in one plane, is of oblong shape in plan (Fig. 23) and that the free end (cut end) 27 of the stem is curled inwardly of the loop so that it is placed and directed away from any "use" area and is either partially or wholly embedded in the body material where it can do no harm to skin or leather when the applicator or dauber is used.

In the process of manufacture the body material, in this instance the dauber body or swab, made from a piece or pad of felt cut from a strip or long length of such material of substantially rectangular shape in outline, is so compressed in a direction parallel to the stem of the finished product (across the material width as respects the material strip) and while the other dimensions are held relatively constant, as to reduce the compressed dimension to approximately one-half (½) of its original size. After the stem end is looped or curled about the thus compressed body, the initial compressing and restraining forces are relieved so that the body expands within the limits permitted by the confining loop or coil of the stem, this confinement limiting expansion of the body (measured in the plane of the loop and parallel to the tangential or straight portion of the stem) to approximately four fifths (⅘) of the original corresponding dimension.

Subsequently and when the loop or coil is flattened to the shape shown in Fig. 23, the body compression, in the plane of the coil or loop, is increased so that the body thickness between the opposite flattened sides of the loop is decreased approximately one third (⅓) of the original material thickness, the compression of the material in a direction perpendicular thereto (measured in the plane of the loop and parallel to the stem) being somewhat decreased by the loop or coil flattening operation. However, those portions of the body material to each side of the plane of the loop are free to and do expand to dimensions closely approximating the original dimensions of the piece or pad when cut from the original material strip. Thus the dauber body is firmly gripped by the stem but without affecting its usefulness while the stem end is so placed that it is utterly harmless.

General structure of the machine

The machine as a whole together with its associated mechanisms is illustrated in Fig. 1 to 4 which, together with Figs. 2, 3, 4 and 6, reference primarily will be made for the time being. The machine proper, generally designated 30, has a frame generally designated 31 mounted upon a suitable hollow pedestal 32 arranged to carry and enclose the power mechanism including an electric motor 33, power transmission 34 and such electrical controls, represented by the push button switches 35, as may be necessary or desirable. Operating parts of the machine proper are driven from a pulley or pulleys 36 carried by the transmission mechanism 34 through V belts 37 running over a pulley or pulleys 38 secured to a drive shaft 39.

Figure 1:
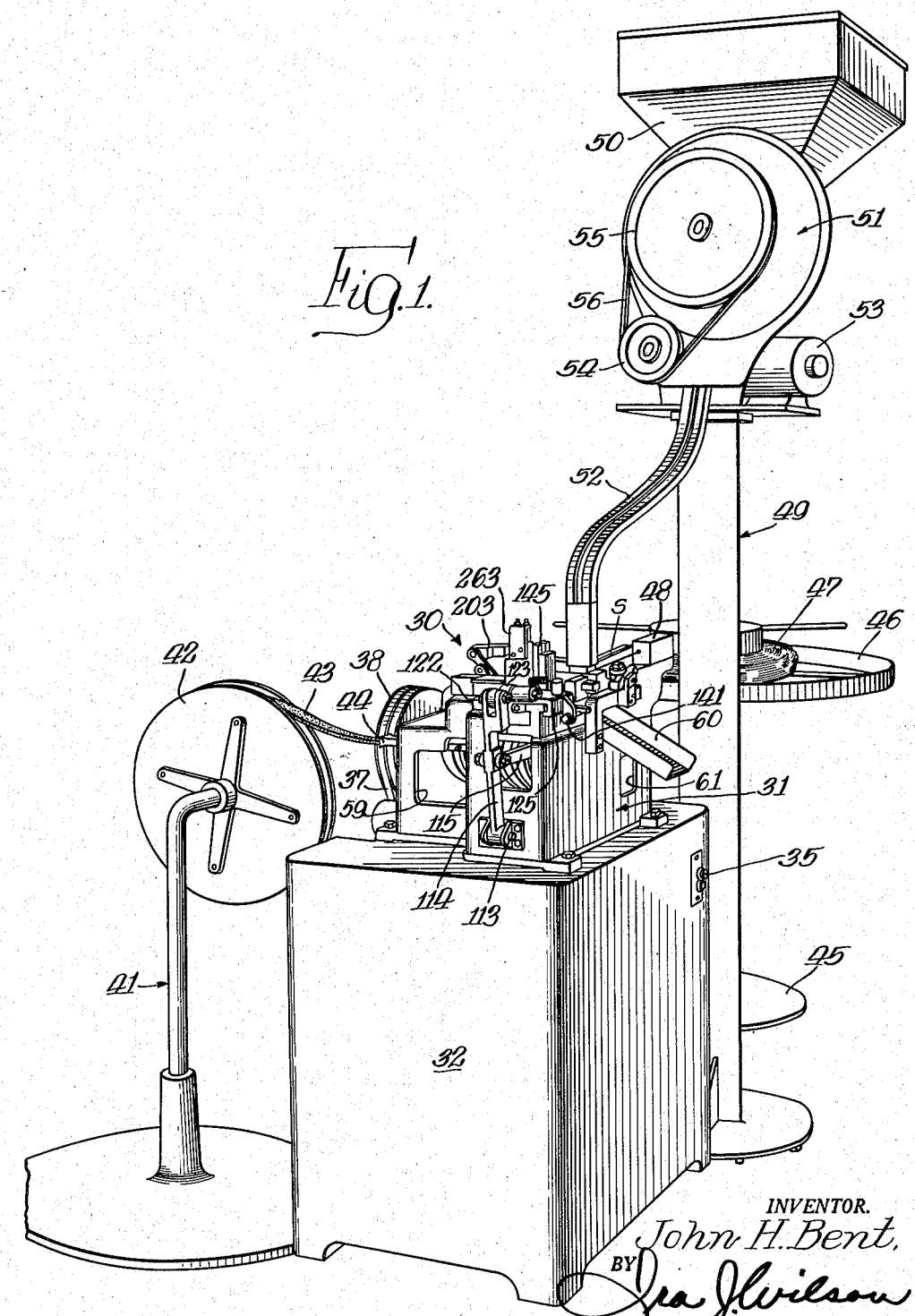
Fig. 1 is a perspective view of the machine showing the relationship of the felt, wire and cap supply devices.

Adjacent to one side of the machine and its pedestal is a stand generally designated 41 adapted to carry a reel 42 rotatably mounted thereon and, if desired, also carrying a roll tensioning or braking device (not shown) for preventing the material, in this instance felt stripping, from unwinding faster than needed. The felt strip carried by the roll shown in Fig. 1 is designated 43 and is to form the dauber or applicator bodies heretofore described. The felt strip 43 is of substantially rectangular cross section as clearly shown in several of the drawing figures and is fed from the reel 42 into the machine through a tube 44 of rectangular cross section.

A second stand, the base 45 only of which is indicated in Fig. 1, is disposed adjacent to another side of the machine and its pedestal for the support of a wire carrying reel 46 rotatably mounted thereon. A coil of wire 47 for dauber or applicator stems is shown mounted upon this reel. Here again, the wire reel may be supplied with any of the well known tensioning, braking or retarding devices employed to prevent undesirable unwinding of the coil. The wire from the coil 47 is fed into the machine through a well known type of wire straightening device designated 48, carried by suitable support S secured to the frame 31 and the details of which will not be described as any of numerous satisfactory types on the market may be employed.

Since the particular daubers or applicators manufactured by the machine include a bottle cap or stopper, which also serves as a finger-grip, a pedestal 49, disposed adjacent to the pedestal carrying the wire reel, supports a cap hopper 50 and mechanism generally designated 51 which orients and feeds caps into a chute 52 from which the caps are withdrawn by the machine as needed. A motor 53 carried by a platform or bracket on the upper portion of the pedestal 49, drives the cap feeding and orienting mechanism 51 through pulleys 54 and 55 and belt 56. Devices for orienting and feeding articles such as the instant caps are well known on the market and per se form no part of the invention.

Drive shaft 39 is mounted in bearings 57 and 58 in turn supported by the machine frame 31 in any desirable manner, bearing 58, for instance, being supported by a bracket 62 shown in Fig. 4 as secured to the machine frame. Adjustably or non-adjustably secured on the shaft 39 for rotation therewith are a plurality of cams designated C-1, C-2, C-3, C-4 and C-5, the purposes and functions of each of which are later to be described. Preferably the machine frame 31 has access or inspection openings such as those designated 59 and 61 which normally and for safety and other purposes may be covered with suitable cover plates (not shown). At the discharge side a delivery chute 60 guides the discharged daubers into any suitable receptacle.

The felt feed, cut-off, transfer and precompression mechanism

Felt fed into the tube 44 travels horizontally in the tube to a section 63 which is curved through 90° so that the felt when it emerges from the upper end 64 of the curved section of the tube is travelling upward. The curved section 63 of the tube forms an arc, the radial center of which is the axial center of a pair of aligned and fixed stub shafts 65 suitably supported by fixed portions of the machine frame 31. The stub shafts 65 provide pivot bearings for a swinging frame which, together with certain devices carried thereby, constitutes the felt feeding mechanism. This mechanism is illustrated in detail in Figs. 13 and 14 of the drawing. The feed mechanism frame includes a pair of arms 66 and 67 so spaced from one another as to straddle the felt tube section 63 and a tubular member 68 which rigidly joins and spaces the two arms 66 and 67 radially beyond the tube section 63. Arm 67 includes an off-set portion and a straight portion 67′ while arm 66 carries pivot pin 69 on the outer end of which is a cam follower roller 71 adapted to ride in the cam slot 72 of cam C-1. Upon each revolution of the shaft 39 the arms 66 and 67 are swung, on the pivots provided by the stub shafts 65, through a predetermined arc to effect feed of the felt strip.

Secured to the arm portion 67′ are a pair of secondary arms 73 which project radially beyond the tube section 63 and each of which has an outer end portion 73′ projecting transversely over the tube section and an upturned end portion 73″ carrying teeth 74. The teeth 74 are adapted to ride back and forth in slots 75 extending in parallelism and longitudinally of and through the outer wall of the tube section 63 so that the teeth may engage spaced areas of the outer side of the felt strip within the tube. The teeth are so designed as to bite into the felt on an upward swing of the secondary arms 73 and to ride over and offer little or no resistance to or pull upon the felt on a downward swinging movement of such arms. Carried by the arm 67′ is a fixed stub shaft 76 upon which a sleeve 77, forming one end of a feed dog 78 is pivotally mounted. The other end of the feed dog 78 carries a pair of spaced and parallel segments 79 operating in a pair of correspondingly spaced slots 81 through the inner side of the tube section 63 and correspondingly opposite to the slots 75. The segments 79 have teeth 80 arranged to bite into the felt on a feeding stroke and to slide over the felt on reverse movement the arrangement being such that, when the arms 66—67 are moving on their forward or upward stroke, the teeth of the feed dog segments 79 and the teeth 74 are caused to grip the felt from opposite sides and to push it up the slot of the tube section 63 for a predetermined distance, the teeth 74 and 80, on the back or downward stroke of the arms 66—67, riding over the felt which is held in the position to which it has been moved by mechanism now to be described. A spring 94 reacts between an abutment 95 on arm 67′ and feed dog 78 thereby normally to press the toothed segments into engagement with the felt and a cam follower roller 78′ is mounted on a suitable pivot pin secured to one side of feed dog 78 for a purpose to be described.

Pivotally mounted on a pivot 82 on the portion 67′ of arm 67 is a rod 83 which at its other end is pivoted at 84 on one end of a lever 85 in turn pivotally mounted on a pivot 86 suitably secured between brackets 87, only one of which is shown, suitably secured to the tube section 63. The opposite end of lever 85 carries a pivoted ratchet dog 88 (spring pressed in a counterclockwise direction viewing Fig. 13) for engagement behind any of a series of teeth formed on the periphery of a ratchet wheel 89 rotatably mounted on the pivot pin 86. Fastened to the ratchet wheel 89 for rotation therewith is a felt feed wheel 91 adapted to project through a central slot 92 in the tube section 63 into engagement with the felt therein. Pivotally mounted on one of the brackets 87 is a holding dog 93 which also is spring pressed in a counter-clockwise direction viewing Fig. 13, into engagement behind the teeth of the ratchet wheel 89.

Upon the upward swinging movement of arms 66—67, therefore, the rotary feed wheel 91 together with the toothed feed dog 74 and segments 79 urge the felt up the slot, the push rod 83, working through the lever 85, serving to rotate the ratchet wheel 89 and thus the felt feed wheel 91 in a counter-clockwise direction (viewing Fig. 13) by a predetermined amount. Upon the return stroke of the arms 66—67 the push rod is pulled back swinging the lever 85 clockwise about its pivot until the dog 88 engages behind a succeeding tooth, the holding dog 93 in the meantime preventing any backward or clockwise rotation of either the ratchet wheel or the feed wheel.

The felt feed cam C-1 imparts a definite swinging stroke to the arms 66 and 67 and associated parts of the felt feed mechanism but since it is sometimes necessary to adjust the lineal amount of felt strip fed up the tube, means are provided for varying the effective functioning of the feed dog 78. This means includes the roller 78′ and a cam track member 63ᶜ (see Fig. 13) having roller engaging arcuate surface A and roller engaging tapered riser surface B, mounted on the side of tube section 63 for adjustment therealong by means of the set screw 44′ and adjustment slots and securing screws or bolts 63ᵈ and 63ᵉ, respectively. On the downstroke or swing of the arms 66—67, the feed dog 78 is disengaged from the felt as and after the roller 78′ engages and rides up the inclined track B onto track A, while on the upstroke the feed dog 78 does not engage and feed the felt strip until the cam roller 78′ rides down and off the tracks A and B. The effective portion of the feed stroke thus may be varied by adjustment of the position of member 63ᶜ.

Figure 9:
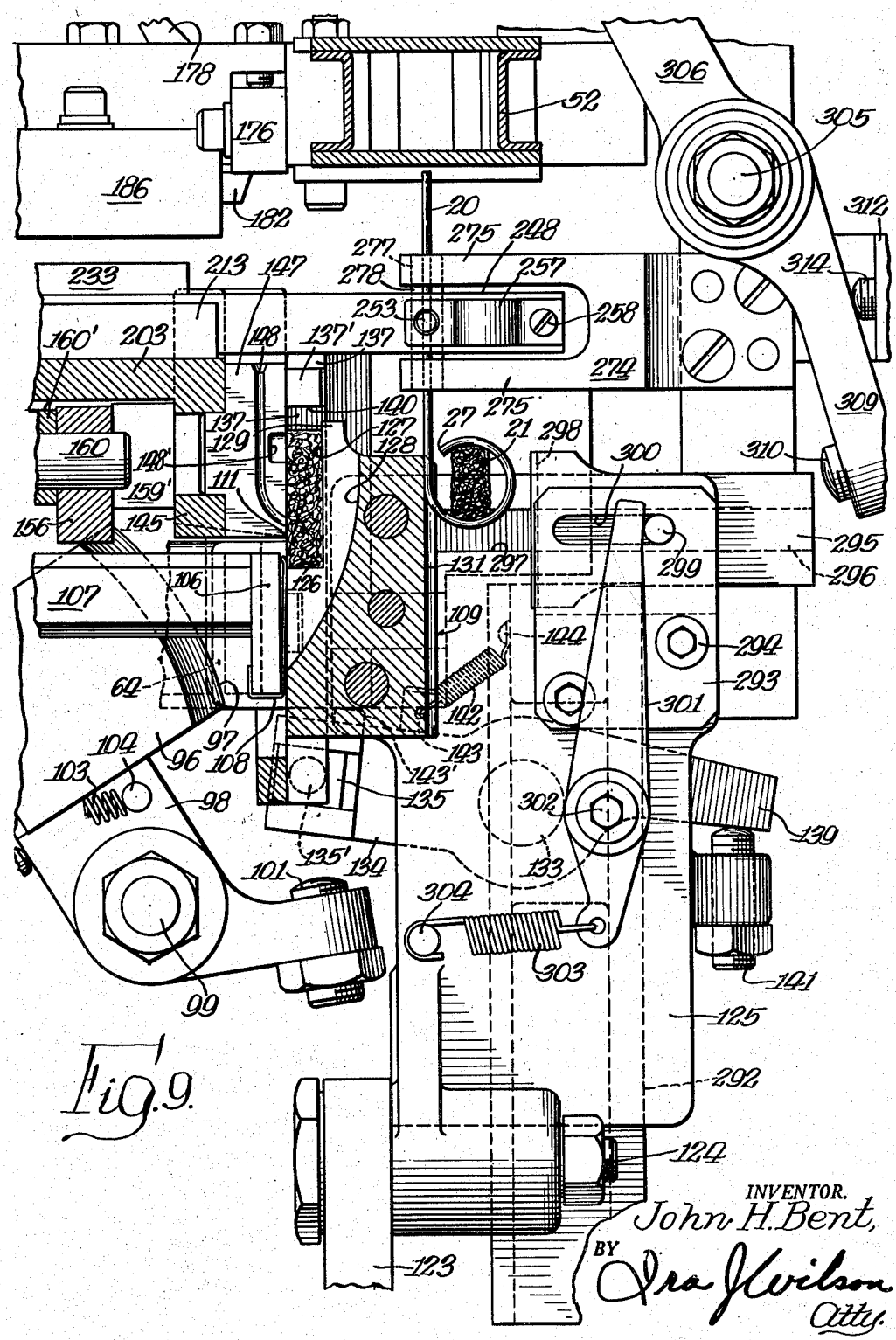

The felt cut-off mechanism shown in several operating positions in Figs. 2, 8, 9, 10 and 13 includes a shearing knife 96 having an arcuate cutting edge 97. The knife blade 96 is removably secured to one arm of a lever 98 which is pivotally mounted upon a pivot pin 99 secured to the machine frame. The other arm of the lever 98 carries an adjustable abutment pin 101 which, at certain predetermined times, is engaged by a reciprocating portion of the machine (to be described) for the purpose of swinging the knife blade about its pivot 99 to effect shearing of a predetermined length of felt for a dauber body. Cooperative with the cutting edge 97 of the knife blade is a fixed shearing edge 102 which may also serve as the inner edge of the outer wall of the felt tube itself. While the felt shearing blade is positively operated to shear the felt, its return to its inoperative position shown in Fig. 9 is effected by means of a spring 103 tensioned between a binding post 104 on lever 98 and a binding post 105 carried on the machine frame, when the machine parts, which have engaged the adjustable abutment pin 101, have retracted.

The piece of felt which has been cut off from the strip and which is to form a dauber body is next transferred from its position where cut off from the strip into a recess in a felt transfer mechanism by which the felt piece is transferred to a position where one end of a wire stem is curled about it, the felt piece first being compressed for the purposes previously described. In order to shift the felt piece from its postion where it is cut off from the strip into the recess and to insure that such piece remains properly in the recess until it has been transferred substantially to the position where it is first compressed and the wire stem is curled about it, the machine is equipped with what may be termed a felt pusher head 106 which is carried by a reciprocable bar 107 slidably mounted in guideways on the machine frame and adapted to be operated in timed relation to the shearing stroke of the felt shearing knife and other mechanisms by means which will later be described. Mounted on the pusher head 106 and projecting across the front face thereof in a diverging angular relation thereto is a leaf spring 108 designed to make engagement over substantially the entire adjacent surface area of the felt piece as the pusher head moves toward the felt piece, and gently to compress the felt to an extent as it urges the felt piece into the recess in the transfer mechanism. At the time that the pusher head reaches the end of its operative or forward stroke (see Fig. 8) the leaf spring 108 is collapsed against the pusher head face, but as the pusher head starts on its retraction stroke the resilience of spring 108 causes it to remain temporarily in engagement with the cut off piece of felt until the transfer of the felt piece is effected by a felt slide and anvil member generally designated 109 (hereinafter more fully described), the spring serving to guide the cut off felt piece past the edge 111 of a portion of the machine frame and body and for a substantial distance into a slot 112 where the compression and stem curling operations are performed. Thereafter progressive retraction of the pusher head returns it to the position shown in Figs. 10 and 13 ready for the next operation, the leaf spring 108 again resuming its initial position apart from the pusher head.

Pivotally mounted on a bracket 113 at what may be termed the front side of the machine fame 31 is a rocker arm or lever 114 which, substantially at a midportion, is pivotally connected to one end of a connecting rod 115, the other end of which carries a cam follower roller 116 adapted to ride in a cam track 117 in cam C–2. A swinging bar 118 pivotally connected to rod 115 by one end as at 119, and at its other end to the machine frame as indicated at 121, supports the connecting rod 115 in a manner to permit it to perform its proper functions. The upper end of the rocker arm 114 is pivotally connected as at 122 to one end of a link 123, the other end of which is pivotally connected at 124 to a slide head 125 which carries the combined felt slide and anvil and other operating mechanism yet to be described. Rotation of the cam C-2 causes reciprocatory movement to be imparted to the connecting rod 115 which, in turn, rocks rocker arm 114 through a predetermined arc about its pivot on bracket 113, thereby reciprocating the slide head 125, the slide head 125 being mounted in suitable guideways on the machine frame for rectilinear reciprocatory movements.

Figure 13:
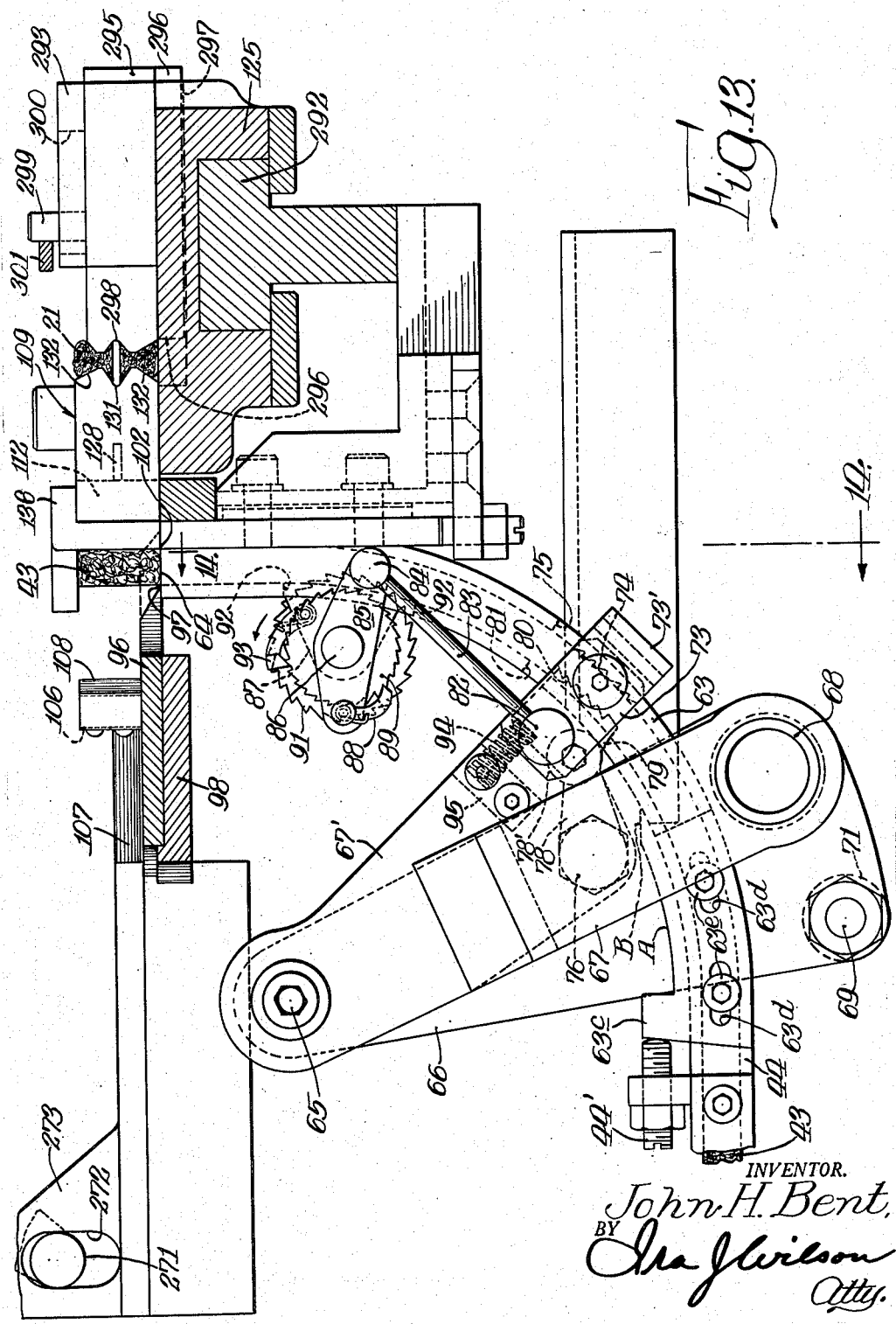
Fig. 13 is an elevation, partly in section, taken on the line 13—13 of Fig. 10, showing certain details of the felt feeding mechanism, the felt cutter being shown in section and the loop flattening hammer in elevation.
Figure 14:
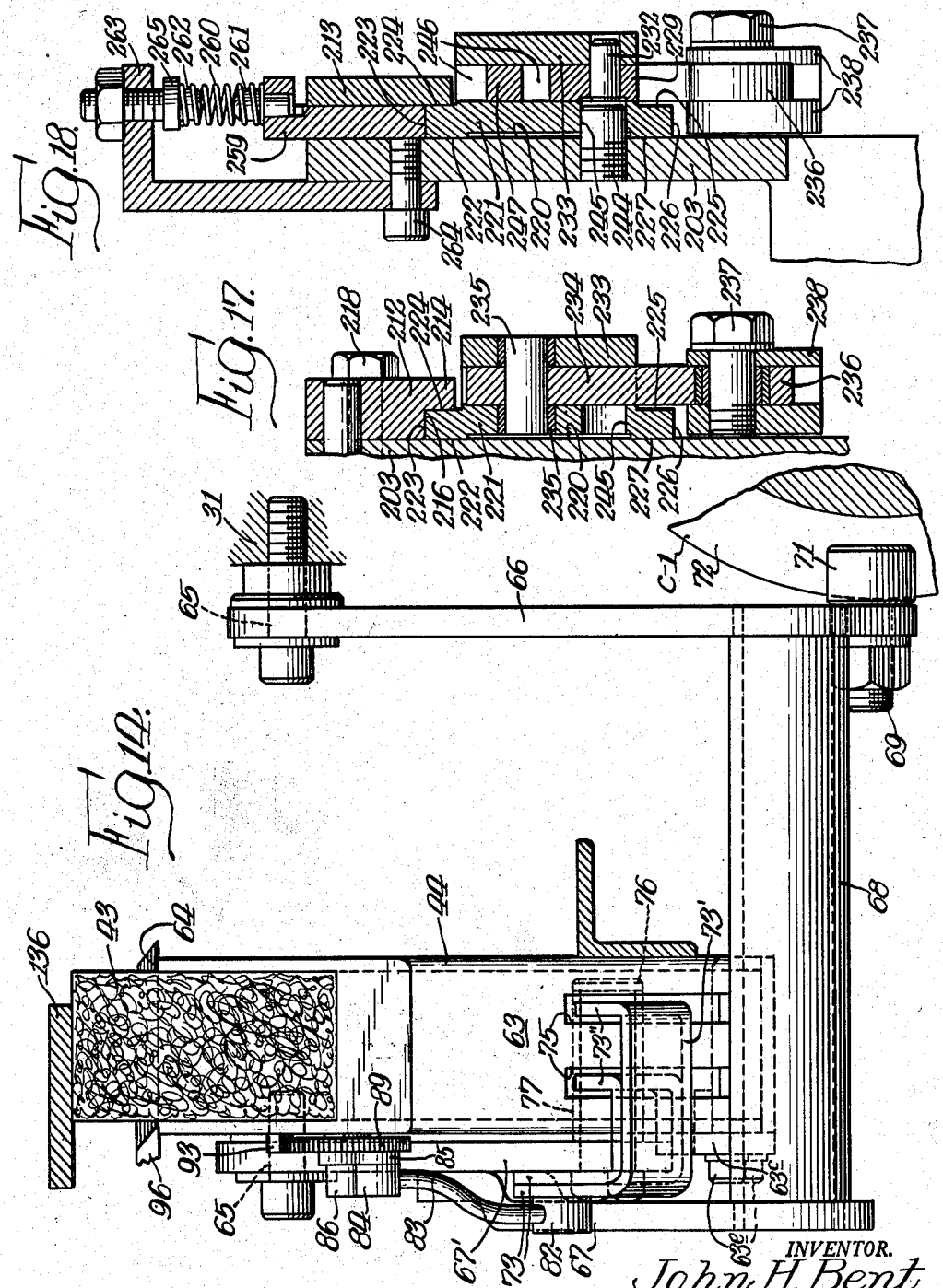
Fig. 14 is a view of the felt feed mechanism looking from the position of line 14—14 of Fig. 13.

The combination felt feed slide and anvil member 109 is fixedly secured to the slide head 125 and therefore partakes of all movements imparted to the latter. This member, which for brevity will be referred to as the felt slide, is of peculiar configuration and is best illustrated in Figs. 8, 9, 10, 11, 12 and 13. As shown in these figures, the felt slide is a generally rectangular block with parallel top and bottom faces and generally parallel longitudinal sides. That side of the slide which is adjacent to the felt strip is cut away from what may be termed its forward end to a place approximately midway of its length to provide a square shoulder 126 and a vertical wall 127 at right angles to the shoulder 126. The recess thus formed forms a continuation of the slot 112 and, together with a felt guide to be described, provides the initial pocket into which the cut off piece of felt is pushed by the pusher head 106. Extending longitudinally of the felt slide 109, midway between its upper and bottom surfaces, is an arcuate slot 128 which extends rearward past the shoulder 126, as will be noted, and at its forward end passes entirely through a nose portion 129 on the forward end of the felt slide. The opposite longitudinal side face of the felt slide, midway between the top and bottom faces, has a groove 131, the opposite sides of which are flared upwardly and outwardly from the bottom throughout its entire length. The upper and lower portions of this side face of the felt slide are bevelled off as indicated at 132, as shown in Fig. 13, for anvil purposes to be described. The rear end of the felt slide is squared off and flat for engagement with the adjustable abutment pin 101 of the felt shear lever 98 thereby to operate the shear on its cutting stroke, as previously described.

Pivotally mounted on a pin 133 on the machine frame beneath the slide head 125 is a lever 134 one end of which, through a cross-head 135, is pivotally connected, as at 135′, with the upper and lower arms 136 and 137, respectively, of what will be termed the felt guide. As will be observed in Figs. 11 and 12, the forward ends of arms 136 and 137 have downwardly and upwardly projecting portions, 136′ and 137′ respectively, which are spaced from one another to provide a gap 138 in exact alignment with the slot 128 in the felt slide 109. The width of the gap 138 and the width of the slot 128 will be slightly greater, perhaps a few thousandths of an inch, than the diameter of the wire used to form the stem of the dauber, and the arrangement is such as to permit clearance of such stem during the curling and sub-assembly transfer operations. The other end of the lever 134 (Fig. 8), designated 139, projects into the path of travel of an adjustable pin 141 carried by the slide head 125 so that when the slide head is moved forward the pin 141 will engage the end 139 of the lever 134 and will cause the latter to swing about its pivot 133, thereby to move the felt guide arms 136 and 137 rearwardly, or outwardly, toward the shoulder 126 on the felt slide. A spring 142 tensioned between a binding post 143 on lever 134 and an anchorage on some fixed portion of the machine frame as at 144 (Fig. 12), serves to retract the felt guide and its operating lever to its forward or inner position when the slide head 125 is retracted while a stop 143′ is engageable with a fixed portion of the machine frame to limit the retraction movement of the guides.

When the slide head 125 is retracted (moved outwardly) the felt slide 109 strikes the adjustable abutment pin 101 and causes the knife 95 to shear off a length or piece of felt whereupon the felt pusher head shifts the cut off piece into the pocket or recess formed between the shoulder 126, the surface 127, the surfaces designated 140 of the felt guide arms and the adjacent surfaces of the die blocks hereinafter described. At this time the parts are substantially in the position shown in Fig. 8. When the felt cut-off knife has retracted to a position where it clears the felt piece which has been cut off, but while the felt pusher head 107 is still in engagement with the cut off piece of felt, the slide head 125 starts forward (inward) moving the felt piece to the position shown in Fig. 9. Just following the initial forward motion of slide 125 the adjustable abutment pin 141 strikes the lever arm 139 and causes the felt guides to move outwardly to bring their inner ends 136', 137', toward and into engagement with the cut off piece of felt, the felt slide continuing its forward motion to compress the felt between the shoulder 126 and the opposed end surfaces 140 of the felt guide arms. The final compressed position of the felt piece is indicated in Fig. 10 between the dotted lines 140 and 126, where full precompression of the felt has taken place, the extent of compression being such as to bring the over-all dimensions of the felt piece within the dimensions of the wire loop to be formed thereabout.

*The wire feed, curling and cut-off, and cap feed*

Rigidly secured to and extending vertically upward from a central portion of the machine frame is a die block guide 145 in which a pair of complementary die blocks 146 and 147 are mounted for limited vertical sliding movements relatively toward and from one another. These die blocks have complementary, mating channels 148 formed therein, the shape of the channels being indicated in Figs. 7, 8, 9, and 20. The entering mouth formed by the combined channels is circularly flared and the channels proper are substantially of the same diameter in their combined relationship as the diameter of the wire to be formed into the stem. A re-entrant recess 148' in each block receives the wire end upon completion of the curl.

Mechanism for opening and closing the dies includes the cam C-3, having a cam track 149 in which cam follower roller 151 is arranged to travel, the cam follower roller being attached to a midportion of a lever 152. The lower end of lever 152 is pivotally supported in a bracket 153 carried by the machine frame, while the upper end is pivotally connected with one end of a link 154 which at its other end is pivotally connected with the lower end 155 of a lever 156 carrying camming rolls or pins 157 and 158 riding in arcuate cam slots 159 and 161, respectively, formed in die block guide members 159' and 161', respectively, firmly secured to the die blocks by means of screws 162 and 163, respectively, the members 159' and 161' being movable with the die blocks. The lever 156, intermediate of its ends and on an axis lying in the parting plane of the dies 146 and 147, is pivoted on a pivot 160 secured to a part 160' of the machine frame and relative to the die block guide 145. It will be noted that the cam slots 159 and 161 extend generally in parallel directions and, while arcuate, are so slanted that when the lever 156 is swung in a clockwise direction (viewing Fig. 20) about the pivotal connection 160 the cam rollers 157 and 158, riding in the cam slots 159 and 161, respectively, will draw (wedge) the dies 146 and 147 tightly together with the wire forming grooves in mating relationship. When the lever 156 is swung in a counter-clockwise direction about the pivot 160 the cam rollers 157 and 158, riding cam slots 159 and 161 in the opposite direction, will force the dies apart. Movement of the dies between closed and open position is sufficient to permit the wire stem to clear from between them.

At what may be termed the rear side of the machine, and secured to the frame 31 thereat, is a bracket 164 to which one end of a rocker arm or lever 165 is pivotally secured as at 166 (Fig. 5). The upper end of the lever 165 is pivotally connected at 167 with a link 168 which, in turn, is pivotally connected at 169 with what may be termed a wire and cap feed head 171 mounted for horizontal sliding movements in suitable guideways on the top of the frame of the machine. Rocker arm 165 is rocked back and forth on the pivot 166 by means of a longitudinally adjustable connecting rod 172 pivotally connected to rocker arm 165 on an adjustable pivot 173 and, at its other end, is pivotally connected at 174 on an outwardly projecting crank or plate 174' carried by cam C-2. As the cam C-2 rotates with the shaft 39 the connecting rod 172 and its associated mechanism causes the wire and cap feed head 171 to move in and out to perform its several functions to be described.

Wire 47 fed into the machine through the straightening device passes through suitable guides 175 and 176 (see Figs. 2 and 7) and past feed dog 177 and holding dog 178 into the forming channel 148 between the upper and lower die blocks 146 and 147. Feed dog 177 is pivotally mounted upon the feed head 171 on a pivot 179 and has a biting edge 181 forced against the wire by a spring 182 which urges the feed dog in a counter-clockwise (viewing Figs. 2 and 7) direction about its pivot 179. As the feed head 171 moves in the feed dog 177 grips the wire and causes the wire to feed through the guide 176 and into the curling dies 146 and 147 but this dog is released from its grip upon the wire when, at the inner part of the movement of the head 171, it strikes the fixed but adjustable pin 177'. The channel between the curling dies then causes the end of the wire to curl as illustrated in Figs. 7, 9 and 10, and, if a piece of felt has been positioned and compressed previous to the feed and curling of the wire, the curled end will encircle the felt piece, as will be appreciated.

Immediately after the curling of the end of a piece of wire, that length of the wire which is to form the dauber stem is sheared from the remainder of the wire by the tapered edge of a shearing blade 182, the operation of which will be described hereinafter. As the feed head 171 is retracted, i. e., moved outward, the holding dog 178, which is pivoted at 183 upon a fixed portion of the machine frame, grips that end of the wire from which a piece has been sheared, through the engagement of its nose 184 with the wire, a spring 185 normally urging the holding dog 178 in a counter-clockwise direction (viewing Fig. 7) into gripping engagement with the wire. The retraction of the feed head 171 causes the feed dog 177 to move in a clockwise direction to release its bite on the wire 47 until the outer limit of movement of the feed head is reached. On the forward or inward movement of the feed head 171 the holding dog 178 releases by clockwise movement to permit the wire to be fed into the curling dies.

The shearing blade 182 is adjustably secured in a slide member 182' which, in turn, is mounted for reciprocation in guideways 186' and 186" provided in a fixed block or head 186 secured to the top of the machine frame and is reciprocated by means of a rocker arm 187 to which the slide member 182' is connected by means of a crosshead 188 and a member 188' which may be integral with slide 182'. The rocker arm 187 is pivotally mounted intermediate of its ends on a pivot pin 189 bearing in a fixed portion of the machine frame and at its lower end carries a cam follower roller 189' adapted to ride in a cam slot 191 in cam wheel C-4. As the shaft 39 is rotated the rocker arm 187 is swung about its pivot to reciprocate the shearing blade 182 in timed relation to other mechanism of the machine. The mechanism for adjusting the shearing blade 182 includes slots 192 in head 186 and slots 192' in slide 182' through or into each of which screws 193, attached to the blade, project, the construction being such that the blade 182 may be clamped to the slide member 182' in any adjusted position longitudinally of the slots 192' while the screw ends may project into slots 192 so that they do not bind against head 186. In order to adjust the position of the shearing blade by fine increments of adjustment, the shearing blade butt end 194 and a shoulder 195 on member 188' are bevelled as shown in Fig. 19 for engagement by a wedge member 196 which is moved relatively to those bevelled surfaces, to effect wedging action, by means of an adjustment setscrew 197 threaded through an arm 198 on member 188'. A lock nut 199 secures the screw 197 in its adjusted position while a clip 199' secured to member 188' retains wedge 196 in position. Of course the screws 193 must be loosened to permit adjustment and tightened to hold the blade in adjusted position after the adjustment has been effected.

The caps when fed into and down the cap chute 52 are stacked on one another in the chute with their closed and open ends oriented in the same respective directions but the lowermost cap comes to rest upon fixed supporting and conformingly curved surface 200 on each side of which is a slot (see Fig. 19) along which fingers 201 of the cap feed and impaling mechanism ride, the fingers 201 having their upper surfaces curved generally to conform to the curvature of the caps. Carried by the feed head 171 in conjunction with the fingers 201 is a circular bumper 202 of resilient rubber or other material adapted to abut against the outer or closed side of each cap resting upon the fingers thereby to aid in positioning the cap and to act as an abutment member to drive the cap onto the free end of the dauber stem, as will be mentioned again hereinafter. The wire and cap feed head 171 is arranged simultaneously to remove a cap or finger grip from the supply chute and to feed it forward for assembly with a sub-assembly of stem and felt body when it is feeding a length of wire into the curling dies for the production of the next stem and body sub-assembly. In this manner one motion of the wire and cap feed head performs the two operations so that two product articles are in process of formation at the same time with obvious advantages.

*The mechanism for transfer of stem and body sub-assembly*

Immediately after the assembly of a stem and a piece of felt for the body of the dauber through the operation of the mechanisms above described, the subassembly is transferred as a unit to a second position where the wire loop about the body is flattened for purposes previously described and a cap or finger piece is impaled upon the free end of the wire stem. The mechanism for effecting this transfer and for gripping and holding the sub-assembly during the loop flattening and cap impaling operations and for releasing the final assembly for discharge from the machine is illustrated in detail in Figs. 15, 16, 17 and 18 and partially in other figures including Fig. 5.

Mounted on the top of the machine frame and secured thereto intermediate of the wire shearing mechanism and the cap chute on one side, and the curling dies and felt slide and guide mechanisms on the other side, is a vertically extending member 203 which may be integral with a side portion of the die block guide 145, these two parts preferably being a single casting. Attached to member 203 at spaced places adjacent to a lower portion thereof by means of studs 204 and 205 are a pair of gibs 206 and 207, the upper portions of which are off-set as indicated at 208 and 209, respectively, to provide aligned slide bearing surfaces 210 and 211. Attached to the upper portion of the member 203 in spaced relation to one another and in spaced relation to the gibs 206 and 207 are another pair of gibs 212 and 213, which may be intergral but which have off-set portions 214 and 215 provided aligned slide bearing surfaces 216 and 217, respectively, studs 218 and 219 serving to secure these gibs to the member 203.

The slide bearing surfaces 210 and 211 are parallel to the side bearing surfaces 216 and 217 and, together with the off-set portions 208, 209, 214 and 215 and the side face 220 of member 203, support and guide a reciprocable plate 221, the plate 221 having bearing surfaces 222, 223, 224, 225, 226 and 227 for sliding engagement with the gib surfaces and surface 220 of member 203. Attached to the plate 221 are spacer blocks 228 and 229, the first by means of screws or rivets 230 and the second by screw or rivet 231 and an alignment dowel pin 232, which in turn carry a backing and cover plate 233. A toggle mechanism head member 234 is pivoted in the slide plate 221 and in the cover plate 233 attached to the slide plate, on trunnions 235, and, at its lower end 236, is pivotally connected at 237 between the forked end of a connecting link 238. The other end of the connecting link 238 is pivotally connected at 239 with a rocker arm or lever 240 pivotally mounted at 241 upon the frame 31, and which carries a cam roller 242 for engagement with the cam track 243 of cam C-5. A pin indicated at 244 in dotted lines in Fig. 15, and in section in Fig. 18, is secured to member 203 and extends into a longitudinal slot 245 in the plate 221 to limit the extent of travel of the plate 221 in each direction.

Figure 16:
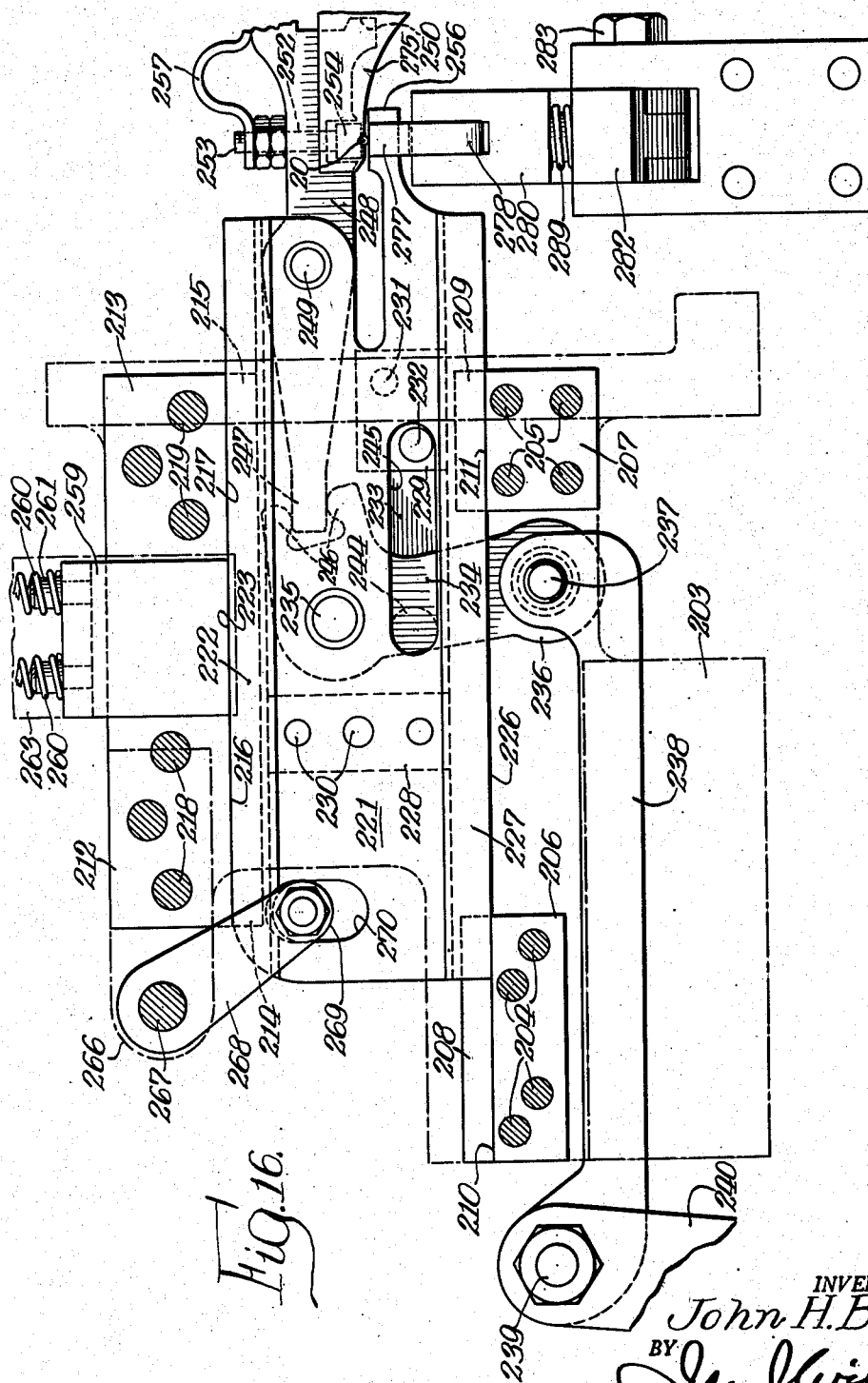
Fig. 16 is a view similar to that of Fig. 15 but showing the parts in a succeeding position and a portion of the operating means.

The toggle head member 234 has a pair of spaced jaws 246 conformed after the manner indicated in Figs. 15 and 16 and between which one end 247 of a toggle lever 248 is disposed. The lever 248 is pivotally mounted intermediate of its ends in the slide plate 221 and cover plate 233 on aligned pivots 249 only one of which is shown. At its other or outer end lever 248 is shaped to provide what may be termed a pusher foot 250 spaced from and below a spring support portion 251. Extending for vertical sliding movements in a vertical bore 252 in an outer portion of lever 248 between the pusher foot 250 and the pivot 249, is a stem 253 of a wire clamp jaw member 254 which is transversely notched as indicated at 255 to seat upon and clampingly to engage a dauber stem 20 resting upon a supporting projection 256 integral with the slide plate 221. A leaf spring 257 anchored to the spring support 251 as by a screw 258 normally urges the stem 253 and the wire clamp jaw member or gripper 254 downwardly thereby to clamp a stem 20 between the gripper jaw and the supporting projection 256.

As the cam C-5 is rotated the lever 240 is rocked about its pivot 241 thereby reciprocating the link 238, which in turn rocks the toggle head member or lever 234 about its pivot 235, first in one direction and then in the other, thereby to swing the clamping lever 248 up or down about its pivot 249. As the toggle head lever 234 is swung about its pivot 235 in a counter-clockwise direction, viewing Fig. 15 in which the parts are shown in retracted position with the clamping or gripper jaw 254 holding a stem ready for transfer to the position indicated in Fig. 16, the first effect of such movement of the toggle head or lever 234 is to swing the lever 248 in a clockwise direction thereby to cause the gripper jaw 254 to clamp the stem 20 tightly against the support 256. As the toggle head 254 continues to swing about its trunnion pivots 235 the resistance to such movement causes the entire transfer mechanism including the slide plate 221, the toggle head 234 and the lever 248 with its associated parts to slide forward (to the right viewing Fig. 15) from the position indicated in Fig. 15 to that indicated in Fig. 16 and until the pin 244, riding in the slot 245, prevents further movement in that direction.

In order to compensate for wear between the slide plate 221 and the gibs 206, 207, 212 and 213, and to have a slight braking effect on the slide plate 221, a wear shoe 259 is mounted for vertical sliding movements between the gibs 212 and 213 and normally pressed downward against the top bearing surface of the slide plate 221 by a pair of springs 260 surrounding centering pins 261 and 262 carried by the wear shoe 259 and an L-shaped standard 263 secured, as by studs 264, to the member 203. Each pin 262 has a spring abutment shoulder 265 and is adjustably mounted in the standard 263 as indicated in Fig. 18.

At that end of the member 203 which is opposite to the portion forming die block guide 145, is an enlarged portion or projection 266 which is transversely bored for the reception of a rock shaft 267, which is pivotally mounted therein. Eac end of the rock shaft 267 is equipped with a crank arm 268, one of which carries a pin 269 for vertical sliding movements in a vertically extending slot 270 in the slide plate 221, while the other carries a pin 271 for vertical sliding movements in a slot 272 (see Fig. 13) formed in an upwardly projecting portion 273 of the pusher head slide bar 107. When the slide 221 is reciprocated its motion serves to rock the crank arm 268 and the shaft 267, thereby simultaneously rocking the other crank arm 268 to cause the pusher head 106 to move forward and back simultaneously with the slide plate 221.

Mounted on the machine frame in alignment with the path of movement of the sub-assembly transfer mechanism is a rigid or stationary wire clamp member 274 having a pair of forked arms 275 spaced to permit the outer or forward end portion of the lever 248 and its wire clamp or gripper mechanism to ride therebetween on forward movement of the slide plate 221 of the transfer mechanism. Each arm 275 is notched on its underside, as indicated at 276, with the notches in alignment, for reception of a dauber stem 20 between them and a movable pair of gripper or clamp jaws 277 provided by the spaced arms of a U-shaped member 278 mounted on a pivot pin 279 secured in a lever 280, the U-shaped member having limited rocking movements on the pivot pin 279 to permit the jaws to adjust and equalize the pressure against the stem 20 and the forked arms 275. The other end of the lever 280 is forked as indicated at 281 to permit it to straddle a lever 282 and is pivotally mounted in trunnions 283 suitably supported by the machine frame. Intermediate of its ends lever 280 carries a pin 284 adapted to have a lost-motion connection with the lever 282 through an elongated slot 285 in the latter.

Lever 282 is also pivoted on the trunnion pivots 283 and, at one end, carries a cam roller 286 for engagement with a cam 287 carried by the wire and cap feed head 171, while at its other end it has a cupped recess 288 for the reception of one end of a coil spring 289, the other end of which is received in a similarly cupped recess in the adjacent end of lever 280. A spring 290, between an anchor pin 291 carried by the lever 282 and a fixed portion of the machine frame, together with the action of spring 289, serves to maintain a slight downward pull on the cam roller end of the lever 282 thereby at all times tending to urge the levers 282 and 280 in a clockwise direction, viewing Fig. 5, in turn to maintain the pin 284 against the top of the slot 285 and at all times tends to hold the jaws 277 pressed against the stationary arms 275. When the wire and cap feed head 171 moves forward or inward a predetermined distance cam 287 engages the cam roller 286 rocking the lever 282 about its pivot fulcrum 283 thereby to swing the opposite end of the lever 282 upwardly to press forcefully against the lever 280 through the interposed spring 289. This action presses the jaws 277 firmly against the stationary pair of forked arms 275 with substantial force thereby to clamp and grip a stem 20 therebetween. Since the connection between the levers 280 and 282 is resilient by reason of the spring 289 and the lost-motion arrangement between the pin 284 and the slot 285, injury to the parts of the mechanism is minimized, although a stem 20 will be firmly and rigidly held between the upper jaws provided by the notches 276 in the forked arms 275 and the lower jaws 277. The force of the action of the transfer mechanism is sufficient to cause a stem 20 to "snap" between the jaws 277 and arms 275 and, likewise, to cause the pusher foot to "snap" the previous stem out from between those jaws and arms.

The timing arrangements of the cams which control the operation of the transfer mechanism including the slide plate 221 and its associated mechanism and the wire and cap feed head 171, and thus the operation of the cam 287 and levers 280 and 282, is such that after the stem has been coiled or looped about a piece of felt it is first firmly gripped between the wire clamp jaw 254 and the supporting projection 256 and immediately thereafter and as the curling dies are opened, the transfer slide 221 and its associated mechanism is moved forwardly from the position indicated in Fig. 15 to that indicated in Fig. 16 where the pusher foot 250 rides between the arms 275 and the jaws 277 until a wire stem of a subassembly "snaps" into place and indexes in register with the notches 276 and between the forked arms 275 and the jaws 277 which, as above explained, are forced apart to admit the entry of the stem 20 between them.

Immediately after the stem has been thus positioned in the notches 276 the cam 287 engages the cam roler 286 thereby to urge the jaws 277 against the stem 20 where it is held until the cap has been impaled, as will be described, and a succeeding forward movement of the slide 221 causes the pusher foot 250 to engage with the stem of the completed assembly and to displace such assembly from the machine onto the chute 60. After the slide plate 221 reaches the forward limit of its motion and the stem and dauber body it carried has been gripped by the jaws 277, the link 238 starts its rearward motion thereby rocking the toggle head 234 in a clockwise direction about its pivots 235 (viewing Fig. 16) which causes the jaws 246 to move the lever 248 in a counter-clockwise direction about its pivot 249 thereby to relax the grip of the gripper jaw 254 upon the stem 20 of the sub-asesmbly. When resistance to the further clockwise movement of the toggle head 234 and the counter-clockwise movement of the lever 248 reaches a predetermined amount, further pivoting of the toggle head 234 and lever 248 ceases, and the entire transfer mechanism including the slide plate 221 is retracted from the position indicated in Fig. 16 to that indicated in Fig. 15, the transferred subassembly stem 20 remaining clamped between the jaws 277 and the notches 276.

Wire loop flattening

The slide head 125 is moved forward and backward, in and out, after the manner previously described, on guideways generally designated 292; and together with the wire and cap feed head 171 operates the mechanism which serves to crush or distort the loop about the dauber body into the final shape previously described and to aid in holding the dauber body and stem firmly in position during the time that the cap or finger piece is being impaled on the free end of the dauber stem. Mounted between the top surface of the slide head 125 and a plate 293 secured to the slide, as by bolts 294, in spaced relation thereabove, is a hammer member 295 arranged for reciprocatory movement transversely of the path of movement of the slide head 125. The hammer member 295 is guided in a predetermined path of movement by a key or rib 296 integral therewith which is arranged to slide in a guideway or slot 297 extending transversely of the top of the slide head 125.

The forward or inner face of the hammer member is slotted or grooved as indicated at 298 across its entire hammer face for the reception of the wire of the loop about the dauber body while the upper and lower edges of the hammer face are bevelled off after the manner of faces 132 of the felt feed slide 109 which at this side serves as an anvil as previously described. Attached to the upper side of the hammer member 295 is a pin 299 which protrudes upwardly through and beyond a slot 300 in plate 293 into the path of one end of a lever 301 which is pivoted on the slide head 125 at 302, and the other end of which is connected to one end of a coil spring 301, the other end of which is secured to a binding post 304 carried by the slide head. The lever 301, when operated by the spring 303, serves to retract the hammer to its outermost position after the latter has performed its function.

Mounted on a vertical pivot 305 on the machine frame is a rock arm 306 carrying a cam roller 307 adapted to be engaged by a camming surface 308 formed on a side member of the wire and cap feed slide head 171. The opposite end 309 of rock arm 306 carries an adjustable abutment screw 310 adapted to strike the outer end of the hammer and to drive the hammer inwardly or forwardly against the wire loop and dauber body thereby to crush or distort the loop and to compress the felt or other body as and for the purposes previously described. A leaf spring 311 secured at one end to a fixed portion 312 of the machine frame, and having its other end 313 resting and pressing against the cam roller end of rock arm 306, serves to hold the cam roller end of the rock arm inwardly in a position to be engaged by the cam surface 308 and, of course, to hold the other end of the rock arm and the abutment screw 310 in its outermost position. A limit screw 314 adjustably mounted in the fixed portion 312 of the machine frame determines the extent to which the rock arm may swing inwardly at one end and outwardly at the other, that is, in a counter-clockwise direction viewing Figs. 2, 7, 8, 9 and 10, under the influence of spring 311.

Operations and timing of operations

It is believed that the operations and the timing of operational sequences while partially explained in the foregoing description, may be best understood by starting with a recitation of the processing operations involved in the manufacture of a single dauber, followed by a description of the manner in which a second or succeeding dauber is involved in process of manufacture while the first is still in process.

Assuming that the machine control mechanism, represented by the push buttons 35, has been turned on and the motor has been started, with the felt, wire and caps ready to be fed, the first operation is the feed of the felt 43 up the tube to a point where a predetermined length thereof has passed the shearing edge 97 of the shearing knife 96, through the operation of cam C–1 and its associated mechanisms above described. As the felt is being fed up the supply tube the slide head 125 is moving outwardly or back to move the felt feed slide 109 outwardly to engage the adjustable abutment screw 101 thereby to drive the felt shearing blade 96 inwardly to cut off the piece of felt which is to form the dauber body and to bring the shoulder 126, forming the outer end of the felt receiving recess or pocket in the felt feed slide, into a position where the felt pusher head 106 can push the felt body into the recess or pocket. Simultaneously the spring 142 is relaxing the felt guide mechanism as the adjustable abutment screw 141 moves outwardly with the slide head 125.

As the felt shearing knife starts to cut the felt the felt pusher head 106 starts forward to engage the cut off piece of felt, being actuated by the mechanism interconnecting it with the transfer mechanism, which in turn is actuated by the cam C–5. Of course, if there is no completed sub-assembly of dauber and stem the transfer mechanism moves through its cycle of operations without performing any useful work. As soon as the felt pusher and its leaf spring 108 have pushed the cut off piece of felt into the recess formed between the felt feed slide 109 and the arms 136 and 137 of the felt guide, the slide head 125 starts forward or inward, thereby pushing the cut off piece of felt from the position indicated in Fig. 8 through that indicated in Fig. 9 to that indicated in Fig. 10. As the slide head 125 moves forward or inward the adjustable abutment pin 141 strikes the end 139 of the lever 134 swinging the lever counter-clockwise, viewing the several figures mentioned, thereby drawing the felt guide arms outwardly and toward the shoulder 126 in the felt feed slide, which action effects the precompression of the felt body therebetween and at a position within the area to be encompassed by the curled end of a wire stem.

During the forward or inward movement of the slide head 125 and the movement of those parts just described which effect transfer of the cut off piece of felt from its point of reception within the felt receiving pocket or recess to the position where a stem end is curled thereabout, the wire and cap feed head 171 is moving in to feed a length of wire to form a stem. As the wire end is moved forward into the forming channels 148 between the die blocks 146 and 147 it encounters the curved section of those forming channels and is curled into a loop which passes around the compressed piece of felt and its end enters the recess 148' between the die blocks. The felt pusher starts moving back while the slide 125 is on its forward or inward movement and completes its recessional movement as the wire stem is curled about the felt body. Just as soon as the wire has been curled or looped about the felt body the slide head 125 starts its outward or backward movement thereby to withdraw the felt feed slide 109 and to disengage the adjustable abutment screw 141 from engagement with the end 139 of the lever 134, this operation permitting the spring 142 to relax the felt guide arms 136 and 137 so that they may move inwardly of the machine away from the felt body about which the stem has been looped.

Practically simultaneously with the completion of the stem loop about the felt body, cam C–4 actuates the wire shear 182 to cut the formed stem from the wire coil supply and immediately thereafter retracts to its inoperative position. Upon severance of the wire stem the wire and cap feed head 171 starts to retract to its outermost or initial position but, as it starts this retracting movement, the holding dog 178 grips the end of the wire from which the dauber stem has been cut to hold it while the feed head retracts and the feed dog 177, which has been released from the wire by its engagement with an abutment stud 177' at the time it reached the forward or inner limit of its feeding movement, rides back along the wire and regrips the wire immediately upon the start of the next forward or inward movement of the head 171.

Next the sub-assembly of stem and felt body is transferred to the position where the hammer 295 effects distortion of the loop and further compresses the felt body about its middle and the cap or finger piece is impaled upon the free end of the stem. To these ends the cam C–3 is timed to operate the mechanism which opens the wire dies 146 and 147 thereby to permit the wire stem to be removed from between them, but just before the dies are opened the cam C–5 effects initial movement of the link 238 (to the right viewing Fig. 15), thereby to swing the toggle head 234 in a counter-clockwise direction thereby to effect clamping of the stem between the wire clamp jaw member 254 and the supporting projection 256 of the transfer slide mechanism. By this time the slide head 125 has been retracted sufficiently to permit the stem and felt sub-assembly to be moved transversely and, since the dies are open, the plate 221 and its associated parts of the transfer mechanism move forward from the position shown in Fig. 15 to that in Fig. 16, at which time the jaws 277 are pressed, with substantial force, against the stem between them and arms 275 thereby to grip the stem. Upon the completion of this transfer operation the transfer plate 221 and the balance of the transfer mechanism are retracted to the position shown in Fig. 15. It is to be observed that the felt pusher is operated to push another piece of felt into the receiving recess between the felt feed slide and the felt guide mechanisms as above described while the transfer mechanism is moving the first assembly from the position of Fig. 15 to that of Fig. 16. The first formed assembly is now ready for distortion of the loop and to have a cap or finger piece impaled upon the free end of the stem.

As the next piece of felt is cut off and pushed into the recess for transfer to the wire curling or looping position the felt feed slide 109, serving as an anvil against which the wire loop and felt are crushed by the action of hammer 295, is moved forward or inward to the position shown in Fig. 10 with the stem of the just transferred sub-assembly lying in the groove or slot 131 so that as the wire and cap feed head moves forward or inward to effect the feeding and curling of the next stem and to impale the cap on the end of the stem of the dauber being completed, the hammer 295 is driven forward or inward sharply against the wire loop by the engagement of the cam roller 307 with the camming surface 308 on the head 171. The cam 308 has a dwell portion 308' which is designed to hold the hammer face firmly against the crushed or distorted wire loop and the compressed felt during that period while the cap or finger piece is being impaled upon the stem end, this action serving to aid the jaws 277 and forked arms 275 in securing the sub-assembly in a rigid position while the cap is being impaled. The sequence of operations so far described is repeated continuously, one sub-assembly of dauber and wire stem being formed as the preceding sub-assembly is being completed at the second position. As the transfer mechanism operates to transfer each succeeding sub-assembly to the cap impaling and loop distorting position the cam 287 disengages from the cam roller 286 to release some of the gripping force of the jaws 277 so that the pusher foot 250, when it engages the stem of the completed dauber assembly, will push or "snap" the dauber from between the jaws 277 and the cooperative notches 276 and cause such completed assembly to drop into the chute 60 for ejectment from the machine.

While I have illustrated and described a preferred embodiment of the invention and have embodied the invention in a machine particularly adapted for the manufacture of applicators of the nature of shoe daubers, it will be apparent to those skilled in the art that the invention features are susceptible of embodiment in other types of machine and are useful for the manufacture of other articles. It should also be appreciated that I have provided a novel process or porcesses which may be carried out by other machines and by hand, and that the article manufactured by the machine has novel features which may be embodied in articles other than shoe daubers and applicators of the nature of the instant ones. Accordingly, I desire to be limited only by the spirit of the invention and the scope of the appended claims.

I claim:

1. In a machine of the character described, means for feeding successive lengths of wire stems in a rectilinear path to a predetermined position, means for feeding an applicator body member to a position adjacent to the first said position, means in said path and operative upon movement of a stem length toward said predetermined position for coiling one end of such stem length about said body member at said adjacent position, means for transferring the assembled stem length and body together to a third position, means operative at said third position for performing another operation upon said assembly, and means for operating said stem length feeding means and said means at the third position at substantially the same time on successive stem lengths.

2. In a machine of the character described, means for supplying said machine with an absorbent material, means for severing said absorbent material into individual applicator body members, means for supplying said machine with a length of wire for forming individual stems for said body members, means for severing said wire into individual stems, transfer mechanism for successively feeding and positioning the individual applicator body members, means for successively wrapping one end of a stem at least partly about a body member, means for flattening and pressing said wrapped end against substantially opposite sides of said body member whereby frictionally to clamp the body member to the stem, and means for securing a finger grip on the other end of said stem.

3. In a machine of the character described, means for feeding to the machine a length of a resilient material, means for feeding to the machine a length of distortable wire, means for severing said resilient material into predetermined lengths, means for severing said wire into predetermined lengths, means for successively compressing and feeding successive lengths of resilient material from its position of severance to a second predetermined position, and means operative upon the second positioning of each successive length of resilient material for curling one end of each length of distortable wire substantially completely about said length of resilient material while the latter is under compression.

4. In a machine of the character described, means for feeding to the machine a length of a resilient material, means for feeding to the machine a length of distortable wire, means for severing said resilient material into predetermined lengths, means for severing said wire into predetermined lengths, means for successively compressing and feeding successive lengths of resilient material to another predetermined position, means operative upon the positioning of each successive length of resilient material for curling one end of each length of distortable wire substantially completely about said length of resilient material while the latter is under compression, and means for distorting and flattening said wrapped end portion of said wire into firm gripping engagement with said resilient material.

5. In a machine of the character described, means for feeding successive body members of resilient compressible material, means for simultaneously feeding successive lengths of distortable wire to form individual stems to each of which a body member is attached, means for successively compressing each body member of resilient compressible material between substantially opposite sides thereof and for transferring and positioning said body member at a predetermined position, and means operative upon the positioning of said body member for looping one end of a wire stem about the body member and substantially into engagement with said opposite sides while the sides are under compression.

6. In a machine of the character described, means for feeding successive body members of resilient compressible material, means for simultaneously feeding successive lengths of distortable wire to form individual stems to each of which a body member is attached, means for successively compressing each body member of resilient compressible material between substantially opposite sides thereof and for transferring and positioning said body member at a predetermined position, means operative upon the positioning of said body member for looping one end of a wire stem about the body member and substantially into engagement with said opposite sides while the sides are under compression, and means for distorting and flattening said end portion of the wire stem into firm gripping engagement with said material.

7. In a machine of the character described, means for feeding successive body members of resilient compressible material, means for simultaneously feeding successive lengths of distortable wire to form individual stems to each of which a body member is attached, means for successively compressing each body member of resilient compressible material between substantially opposite sides thereof and for transferring and positioning said body member at a predetermined position, means operative upon the positioning of said body member for looping one end of a wire stem about the body member and substantially into engagement with said opposite sides while the sides are under compression, means for distorting and flattening said end portion of the wire stem into firm gripping engagement with said material, and means for applying a finger grip to each stem in spaced relation with its body member.

8. The method of forming a device of the character described which comprises successively feeding a continuous supply of a resilient compressible material, severing said material into predetermined lengths to form individual bodies of said material, pre-compressing each body of said resilient compressible material, looping one end of a wire about each body while the latter is held under said pre-compression, and thereafter distorting and flattening said loop into confining engagement with said body.

9. The method of forming a device of the character described which comprises successively feeding a continuous supply of a resilient compressible material, severing said material into predetermined lengths to form individual bodies of said material, feeding and pre-compressing each body of said resilient compressible material, looping one end of a deformable wire about each body while the latter is held under said pre-compression, and thereafter distorting said loop into confining engagement with said body and increasing the compression of the portion of the body material between portions of the loop.

10. The method of forming an applicator of the character described which comprises successively feeding a continuous strip of an absorbent and compressible applicator material, severing said strip of material into individual lengths each forming a compressible applicator body, pre-compressing each individual applicator body, feeding and transferring and positioning said pre-compressed applicator body, coiling one portion of a length of a deformable wire about said positioned pre-compressed applicator body so that the coil forms a substantially complete loop about the body and retains the body under compression, and applying a distorting compressive force from opposite ends of a diameter of the coil toward said body, the free end of said coil being adjacent to one end of said diameter with opposite sides of the coil flattended by said compressive force.

11. The method of forming an applicator of the character described which comprises successively feeding a continuous strip of an absorbent and compressible applicator material, severing said strip of material into individual lengths each forming a compressible applicator body, feeding a continuous supply of deformable wire, severing said wire into predetermined lengths, pre-compressing each individual applicator body, transferring to and repositioning said pre-compressed applicator body, coiling one end portion of a length of wire about said positioned body so that the coil forms a substantially complete loop about the body and retains the body under compression, and applying a distorting compressive force from opposite ends of a diameter of the coil toward said body, the free end of said coil being adjacent to one end of said diameter, the distorting compressive force being sufficient to compress and flatten the opposite sides of the coil and confine the body material to a substantially greater extent than effected by said pre-compression.

JOHN H. BENT.

References Cited in the file of this patent
UNITED STATES PATENTS

| Number | Name | Date |
|---|---|---|
| 419,675 | Horsey | Jan. 21, 1890 |
| 717,180 | Emmert | Dec. 30, 1902 |
| 831,014 | Leonard | Sept. 11, 1906 |
| 1,507,953 | Codina | Sept. 9, 1924 |
| 1,702,813 | Codina | Feb. 19, 1929 |
| 1,815,478 | Mir | July 21, 1931 |
| 1,875,551 | Barnett | Sept. 6, 1932 |
| 2,314,306 | Cave | Mar. 16, 1943 |
| 2,346,782 | Piluso | Apr. 18, 1944 |